(12) United States Patent
Howells et al.

(10) Patent No.: US 11,133,930 B2
(45) Date of Patent: Sep. 28, 2021

(54) SECURITY CREDENTIALS

(71) Applicant: Metrarc Limited, Colchester (GB)

(72) Inventors: William Gareth James Howells, Whitstable (GB); Klaus Dieter McDonald-Maier, Harwich (GB)

(73) Assignee: Metrarc Limited, Colchester (GB)

( * ) Notice: Subject to any disclaimer, the term of this patent is extended or adjusted under 35 U.S.C. 154(b) by 168 days.

(21) Appl. No.: 16/497,311

(22) PCT Filed: Mar. 23, 2018

(86) PCT No.: PCT/GB2018/050758
§ 371 (c)(1),
(2) Date: Sep. 24, 2019

(87) PCT Pub. No.: WO2018/172782
PCT Pub. Date: Sep. 27, 2018

(65) Prior Publication Data
US 2020/0382295 A1    Dec. 3, 2020

(30) Foreign Application Priority Data

| Mar. 24, 2017 | (GB) | 1704742 |
| Mar. 24, 2017 | (GB) | 1704743 |
| Mar. 24, 2017 | (GB) | 1704744 |
| Mar. 24, 2017 | (GB) | 1704746 |

(51) Int. Cl.
*H04L 9/08* (2006.01)
*H04L 9/30* (2006.01)

(52) U.S. Cl.
CPC ........... *H04L 9/0866* (2013.01); *H04L 9/302* (2013.01); *H04L 9/3066* (2013.01)

(58) Field of Classification Search
CPC ...... H04L 9/0866; H04L 9/302; H04L 9/3066
USPC .......................................................... 380/44
See application file for complete search history.

(56) References Cited

U.S. PATENT DOCUMENTS

| 8,316,237 | B1 * | 11/2012 | Felsher | H04L 9/0825 |
| | | | | 713/171 |
| 2016/0050067 | A1 * | 2/2016 | Merchan | H04L 9/3242 |
| | | | | 713/171 |
| 2018/0198609 | A1 * | 7/2018 | Khan | H04L 9/3231 |
| 2018/0262331 | A1 * | 9/2018 | Noguchi | H04L 9/0662 |
| 2019/0342105 | A1 * | 11/2019 | Adams | H04L 9/3278 |
| 2020/0387614 | A1 * | 12/2020 | Harrison | G06F 21/64 |

OTHER PUBLICATIONS

Papoutsis et al., "Integrating Feature Values for Key Generation in an ICmetric System", IEEE, doi: 10.1109/AHS.2009.30, 2009, pp. 82-88. (Year: 2009).*

(Continued)

*Primary Examiner* — Peter C Shaw
(74) *Attorney, Agent, or Firm* — Cook Alex Ltd.; R. Blake Johnston

(57) ABSTRACT

A method for generating an encryption key for use in an encryption process at a device, the method comprising: measuring respective values of a plurality of features of the device to generate a plurality of feature values, normalising the feature values using a respective normalisation map for each feature to generate a plurality of normalised values, and generating the encryption key in dependence on the normalised values.

19 Claims, 16 Drawing Sheets

(56) References Cited

OTHER PUBLICATIONS

Yadav et al., "Secure Device Identification Using Multidimensional Mapping", IEEE, doi: 10.1109/EST.2019.8806218, 2019, pp. 1-5. (Year: 2019).*

Hopkins, Andrew B. T.; et al. "Ensuring data integrity via ICmetrics based security infrastructure." Second NASA/ESA Conference on Adaptive Hardware and Systems (AHS 2007) (2007): 75-81.

Kovalchuk, Yevgeniya; et al., "Overview of ICmetrics Technology—Security Infrastructure for Autonomous and Intelligent Healthcare System." (2011).

Tahir, Ruhma; et al., "A Scheme for the Generation of Strong ICMetrics Based Session Key Pairs for Secure Embedded System Applications." 2013 27th International Conference on Advanced Information Networking and Applications Workshops (2013): 689-696.

International Search Report and Written Opinion of the International Searching Authority for International Application No. PCT/GB2018/050758, dated Aug. 20, 2018 (14 pages).

* cited by examiner metrarc.com

Home | About | Contact | Tools | Video | e-Referral Service | Communities | IPS

*NHS* choices  Your health, your choices

| Health A-Z | Live Well | Care and support |

Log in to NHS Choices

Email address: metrarc.development@gmail.com
Password: ●●●●●●●●●●

( Log in > )

Forgotten your password?

FIG. 7G

SECURITY CREDENTIALS

CLAIM OF PRIORITY

The present application is the U.S. National Stage of PCT International Patent Application No. PCT/GB2018/050758, filed Mar. 23, 2018, which claims the benefit of and priority to GB Patent Application Nos. GB1704746.5., filed Mar. 24, 2017, GB1704744.0, filed Mar. 24, 2017, GB1704743.2, filed Mar. 24, 2017, and GB1704742.4, filed Mar. 24, 2017, the contents of all of which are hereby incorporated herein by reference.

BACKGROUND

The digital revolution has transformed the way we create, destroy, share, process and manage information, bringing many benefits in its wake. An ever-increasing number of embedded consumer and communication devices are at the heart of this revolution. However, such technology has also increased the opportunities for fraud and other related crimes. Therefore, as the adoption of such technologies expands, it is vital to ensure the integrity and authenticity of electronic digital systems and to manage, control access to and verify their identity. The need to protect the integrity of each device (such as the identity of a network computer or a mobile telephone) has long been recognised, but the increasingly widespread adoption of embedded devices raises new challenges, particularly where these devices are communicating autonomously. Current methods to protect data (passwords, biometrics, encryption etc.) are unable to fully address the relevant security requirements. Passwords can be forgotten or stolen if written down. Similarly, since biometric reference templates and private encryption keys have to be stored, unauthorised access to them may compromise the security of any data protected by them.

There is a need for an improved way of securing data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to an aspect of the present invention there is provided a method for generating an encryption key for use in an encryption process at a device, the method comprising measuring respective values of a plurality of features of the device to generate a plurality of feature values, normalising the feature values using a respective normalisation map for each feature to generate a plurality of normalised values, and generating the encryption key in dependence on the normalised values.

Suitably the method comprises modifying the measured values of the plurality of features to generate a plurality of modified values, and using the modified values as the feature values. Suitably modifying the measured values comprises performing one or more of a mask operation and a bit-shift operation on the measured values. Suitably the mask operation comprises applying one or more of a bitwise XOR mask and a bitwise XNOR mask to at least one predetermined bit.

Suitably the method comprises calibrating the feature values in advance of generating the encryption key by determining a plurality of calibration values for each of the plurality of features of the device, generating a distribution of calibration values for each feature, normalising each distribution, and generating the respective normalisation map for each feature in dependence on the normalised distributions. Suitably calibrating the feature values comprises determining the plurality of calibration values for at least one feature at a plurality of devices. Suitably the distribution comprises the frequency of occurrence of each calibration value. Suitably normalising the distribution comprises associating a calibration value of a particular feature to a predetermined value. Suitably normalising the distribution comprises associating a set of calibration values of the particular feature to the predetermined value. Suitably the set is a range of calibration values.

Suitably each calibration value comprises a word of a predetermined size. Suitably the predetermined value comprises a word of a predetermined size. Suitably the method comprises generating the encryption key using a key generation algorithm which combines the normalised values. Suitably the normalised values comprise words of a predetermined size.

Suitably the method comprises dividing the encryption key to form an asymmetric key pair, and using the asymmetric key pair to provide a digital signature.

Suitably the plurality of features comprises one or more hardware feature and/or one or more software feature. Suitably the plurality of features comprise an indication of one or more of network connectivity of the device, network activity of the device, VOIP activity of the device, location service activity of the device, a MAC address and/or a serial number of the device, the number and/or identity of open ports of the device, the number and/or identity of active processes of the device, disk performance during one or both of a read operation and a write operation, an amount of free and/or active RAM at the device, the number and/or identity of one or more hardware components of the device, a device-specific bias associated with an embedded system at the device, a temperature of a hardware component of the device, a power state of the device, a sensor of the device and/or an output of the sensor, a data and/or a media file at the device, a contact list at the device, how the device is accessed, telephony codes used by the device, and an attribute of a container at the device, the attribute being associated with at least one of a CPU feature, a memory feature and a network-related feature.

Suitably the indication of network connectivity comprises an indication of one or more of: whether the device is connected to a network, a measure of performance of a network connection, whether the network connection is over a WAN and/or a LAN, whether the network connection is over one or more of a cellular connection, a Wi-Fi connection, a Bluetooth connection, a NFC connection, a network identifier, an IP address of the device. Suitably the indication of the network identifier comprises a subset of the characters of the network identifier.

Suitably the indication of whether the device is connected to a network comprises a Boolean value, and/or one of a "connected" state, a "connecting" state, a "disconnecting" state and a "communicating" state. Suitably the indication of network activity of the device comprises a measure of data served and/or consumed by the device. Suitably the indication of location service activity of the device comprises an indication of one or both of the latitude of the device and the longitude of the device.

Suitably the indication of the power state of the device comprises an indication of the battery level, a time since last charge, a frequency of charging over a predetermined charging time period, an average battery level over a predetermined usage time period, an indication of whether the battery is charging, and/or an indication of whether the battery is connected to a power source.

Suitably the encryption key is used in an RSA algorithm, and the method comprises determining whether the encryption key is co-prime with the number of totatives of the RSA algorithm, and if so using the encryption key as the private key in the RSA algorithm, otherwise determining the result of an offset function of the encryption key, where an offset is selected so that the result of the offset function is co-prime with the number of totatives of the RSA algorithm, and using the result of the offset function as the private key of the RSA algorithm.

Suitably the encryption key is used in an elliptic curve cryptographic algorithm, wherein parameters of the elliptic curve algorithm comprise a base point G of the elliptic curve and a multiplicative order n of the base point, the method comprising determining whether the encryption key is within [1, n−1], and if so using the encryption key as the private key of the elliptic curve algorithm, otherwise applying a modulo-operation to the encryption key with n as the modulus to obtain the private key.

According to another aspect of the present invention, there is provided a method for securely processing a private key at a device comprising receiving a private key at the device, receiving an encryption key generated as described herein; combining the encryption key with the private key using a combination function to generate an enhanced key, and storing the enhanced key. Suitably at least one of the private key and the encryption key is discarded in response to storing the enhanced key. Suitably the combination function comprises a XOR function. Suitably the enhanced key is combined with a symmetric blockcypher algorithm to generate a modified enhanced key.

According to another aspect of the present invention, there is provided a method for securely processing a private key at a device comprising receiving an encryption key generated as described herein, combining the encryption key with the enhanced key generated as described herein, wherein the encryption key and the enhanced key are combined using a combination function to thereby retrieve the private key. Suitably at each successive retrieval of the private key a new enhanced key is generated in dependence on the previous enhanced key.

According to another aspect of the present invention, there is provided a system for generating an encryption key for use in an encryption process at a device, the system comprising a processor configured to measure respective values of a plurality of features of the device to generate a plurality of feature values, normalise the feature values using a respective normalisation map for each feature to generate a plurality of normalised values, and generate the encryption key in dependence on the normalised values.

According to another aspect of the present invention there is provided a method for generating an enhanced security credential at a device comprising receiving a first security credential at the device, determining a second security credential in dependence on one or more feature of the device, combining the first security credential and the second security credential to form the enhanced security credential, and outputting the enhanced security credential.

Suitably the first security credential is a user password. Suitably the enhanced security credential is output in response to receiving the first security credential. Suitably only the enhanced security credential is output from the device. Suitably the enhanced security credential is output to a keyboard buffer. Suitably the second security credential is determined by measuring respective values of a plurality of features of the device to generate a plurality of feature values, normalising the feature values using a respective normalisation map for each feature to generate a plurality of normalised values, and generating the second security credential in dependence on the normalised values.

Suitably the method comprises determining whether each character of the enhanced security credential satisfies a set of requirements for the enhanced security credential, and modifying each character to satisfy the set of requirements in dependence on the determination. Suitably the set of requirements identifies a set of valid characters, and the step of determining whether each character satisfies the set of requirements comprises determining whether each character of the enhanced security credential is identified in the set of valid characters, and modifying each character in dependence on that determination.

Suitably the set of requirements identifies a number of required characters from two or more sets of characters, and in which the method comprises determining whether the characters of the enhanced security credential satisfy the required number of characters from each set of characters, and in dependence on the determination, selecting a character of the enhanced security credential and modifying the character to be a member of one of the sets of characters. Suitably modifying a character of the enhanced security credential comprises taking the value of the character modulo the valid range of character values and adding a minimum valid character value to the result.

According to another aspect of the present invention, there is provided a system for generating an enhanced security credential at a device, the system comprising a processor configured to receive a first security credential at the device, determine a second security credential in dependence on one or more feature of the device, combine the first security credential and the second security credential to form the enhanced security credential, and output the enhanced security credential.

According to another aspect of the present invention, there is provided a method for processing a secure key at a device in dependence on a plurality of security credentials comprising determining a tolerance value indicating the number of security credentials required to process the secure key, determining coefficients of a polynomial of an order that is one less than the tolerance value, the secure key being a function of the polynomial, determining a plurality of security credentials in dependence on one or more feature of the device, the number of security credentials being equal to or greater than the tolerance value, using each security credential as a first parameter of the polynomial to generate a set of corresponding second parameter values, and storing the set of second parameter values and a value indicating the order of the polynomial.

Suitably the function of the polynomial comprises a value of the polynomial at a pre-determined location. Suitably the function of the polynomial comprises the y-intercept of the polynomial. Suitably each security credential is used as an x-value of the polynomial and the second parameter values comprise y-values. Suitably the security credentials and the polynomial are discarded in dependence on storing the set of second parameter values and the value indicating the order of the polynomial.

According to another aspect of the present invention, there is provided a method for processing a secure key at a device in dependence on a plurality of security credentials comprising (a) determining a plurality of security credentials in dependence on one or more feature of the device, (b)

reading a stored set of parameter values and a stored value indicating an order of a polynomial, (c) determining coordinates from respective ones of the security credentials and respective ones of the parameter values, (d) using at least a subset of the determined coordinates to determine coefficients of a polynomial with an order indicated by the stored value, (e) determining a predetermined function of the polynomial, (f) storing the predetermined function as a possible secure key,(g) repeating steps (d) to (f) for all the subsets of coordinates to determine a set of possible secure keys, (h) verifying whether the set of possible secure keys comprises the secure key.

Suitably the stored set of parameter values and the stored value indicating an order of a polynomial are generated as described herein. Suitably the verifying step comprises attempting to decrypt a message previously encrypted by the secure key with each of the possible secure keys, wherein the possible secure key that successfully decrypts the message is determined to be the secure key. Suitably the retrieved secure key is used to access a secured system at the device.

Suitably the method comprises determining that the verification is unsuccessful, and in dependence on that determination (i) using a subset of the generated coordinates to determine coefficients of a reduced-order polynomial with an order reduced by an integer compared to the polynomial of step (d), (j) determining a predetermined function of the reduced-order polynomial, (k) storing the predetermined function of the reduced-order polynomial as a possible alternative key, (l) repeating steps (i) to (k) for all the subsets of coordinates to determine a set of possible alternative keys, (m) verifying whether the set of possible alternative keys comprises an alternative key of a set of alternative keys by attempting to decrypt a message previously encrypted by each of the set of alternative keys with each of the possible alternative keys, wherein the possible alternative key that successfully decrypts the message is determined to be the alternative key.

Suitably the method comprises granting a level of security access at the device in dependence on the integer which results in the retrieval of the alternative key. Suitably features of the device are grouped into a feature set, and a security credential is determined in dependence on the feature set. Suitably a feature set comprises related features of the device. Suitably a weighting is applied to a set to form a weighted set, and the security credential is determined in dependence on the weighted set.

Suitably the method comprises determining that one of the secure key and the alternative key is successfully verified, identifying that a security credential is outside a range of valid values for the security credential, and modifying a mapping relating to the security credential such that the security credential is mapped by the modified mapping to be within the range of valid values. Suitably the mapping is performed in dependence on a normalisation map. Suitably the modified mapping permits the security credential to generate a valid point on at least one of the polynomial and the reduced-order polynomial.

Suitably one or more security credential corresponds to a device of a plurality of devices. Suitably one of the plurality of devices requests an identifier from a new device, and the identifier is used to produce a coordinate pair on at least one of the polynomial and the reduced-order polynomial, such that the new device is able to retrieve one or more of the secure key and the alternative key.

According to another aspect of the present invention, there is provided a system for processing a secure key at a device in dependence on a plurality of security credentials comprising a processor configured to (a) determine a plurality of security credentials in dependence on one or more feature of the device, (b) read a stored set of parameter values and a stored value indicating an order of a polynomial, (c) determine coordinates from respective ones of the security credentials and respective ones of the parameter values, (d) use at least a subset of the determined coordinates to determine coefficients of a polynomial with an order indicated by the stored value, (e) determine a predetermined function of the polynomial, (f) store the predetermined function as a possible secure key, (g) repeat (d) to (f) for all the subsets of coordinates to determine a set of possible secure keys, and (h) verify whether the set of possible secure keys comprises the secure key.

According to another aspect of the present invention, there is provided a method for entropy smoothing in an encryption key generation process at a device, comprising determining a plurality of security credentials in dependence on one or more feature of the device, determining a correlation between two of the plurality of security credentials, determining probability distributions of the security credentials and of the correlated security credentials, and in dependence on a comparison of the probability distributions, generating the encryption key using one or more of the plurality of security credentials and the correlation to thereby reduce probability variations in the generation of the encryption key.

Suitably the method comprises determining a correlation coefficient of the correlation, in which the encryption key is generated by using the correlation coefficient as well as or in place of the correlated security credentials. Suitably the encryption key is generated by combining two of the plurality of security credentials using a predetermined weight matrix. Suitably generation of the encryption key is performed using an entropy smoothing algorithm. Suitably the method comprises determining the variance of the correlation coefficient for a range of security credentials, and generating the encryption key in dependence on the variance.

Suitably the range of security credentials comprises security credentials determined from a plurality of devices and/or from a plurality of determination steps at one device. Suitably generation of the encryption key is performed using the entropy smoothing algorithm in dependence on the variance.

According to another aspect of the present invention, there is provided a method for securely processing a private key at a device comprising receiving a private key at the device, receiving an encryption key generated as described herein; combining the encryption key with the private key using a combination function to generate an enhanced key, and storing the enhanced key.

Suitably at least one of the private key and the encryption key is discarded in response to storing the enhanced key. Suitably the combination function comprises a XOR function. Suitably the enhanced key is combined with a symmetric blockcypher algorithm to generate a modified enhanced key.

According to another aspect of the present invention, there is provided a method for securely processing a private key at a device comprising receiving an encryption key generated as described herein, and combining the encryption key with the enhanced key generated as described herein, wherein the encryption key and the enhanced key are combined using a combination function to thereby retrieve the private key.

Suitably at each successive retrieval of the private key a new enhanced key is generated in dependence on the previous enhanced key.

According to another aspect of the present invention, there is provided a system for entropy smoothing in an encryption key generation process at a device, comprising a processor configured to determine a plurality of security credentials in dependence on one or more feature of the device, determine a correlation between two of the plurality of security credentials, determine probability distributions of the security credentials and of the correlated security credentials, and in dependence on a comparison of the probability distributions, generate the encryption key using one or more of the plurality of security credentials and the correlation to thereby reduce probability variations in the generation of the encryption key.

According to another aspect of the present invention, there is provided computer program code for performing a method as described herein.

According to another aspect of the present invention, there is provided a non-transitory computer-readable storage medium having stored thereon computer-readable instructions that, when executed at a computer system, cause the computer system to perform a method as described herein.

Any one or more feature of any aspect above may be combined with any one or more feature of any other aspect above. Any apparatus feature may be rewritten as a method feature, with the necessary changes being made in the wording. These have not been written out in full here merely for the sake of brevity.

BRIEF DESCRIPTION OF THE DRAWINGS

The present invention will now be described by way of example with reference to the accompanying drawings. In the drawings:

FIGS. 7F and 7G illustrate populating a password field in a webpage at mobile devices using the password enhancer app of FIGS. 7D and 7E;

DETAILED DESCRIPTION

Figure 1:
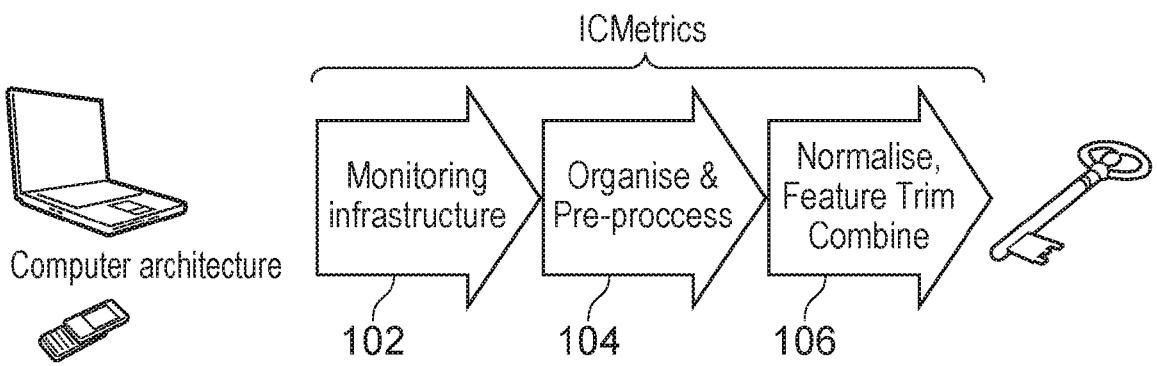
FIG. 1 illustrates stages in a key generation process.

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The present techniques represent an exciting new approach for generating unique identifiers for embedded devices. This approach can enable secure encrypted communication between devices, which can potentially significantly reduce both fraudulent activity, such as eavesdropping, and device cloning. While data encryption techniques are now highly sophisticated and well established, encryption itself cannot necessarily protect against fraudulent data manipulation when the security of encryption keys cannot be absolutely guaranteed. The use of authentication as discussed herein represents a novel concept of regulating access to devices and is aimed at providing protection at the especially vulnerable points where data access is initiated.

The present approach makes use of device metrics, which can be termed ICMetrics. ICMetrics possess the following significant potential:

permitting secure communication from mobile and pervasive computing devices via the direct generation of digital signatures and encryption keys from the internal behavioural characteristics of software and/or hardware associated with the device. Such characteristics can be called features of the device. This naturally implies the major advantage that no encryption keys or device characteristic templates need be stored. Where they are not stored, they cannot be stolen by a hacker. This can therefore increase the security of systems using the encryption keys.

preventing unauthorised access to embedded and distributed devices that are increasingly connected wirelessly.

preventing fraudulent cloning or imitation of a device in order to compromise its identity and subsequent communication.

implicitly detecting tampering of the software and/or hardware associated with the device via the inclusion of spyware or similar virus software since this will implicitly cause the digital signature to vary.

Further benefits lie in the potential for the direct encryption of data extracted from ICMetric samples which characterise the identity of the device. Such a system will suitably offer the following significant advantages:

the removal of the need to store any form of template for validating the device. This directly addresses the major weakness that the feature templates are accessed and used to circumvent the security afforded by the system.

the security of the system is as strong as the ICMetric and encryption algorithm employed (there is no back door). The only mechanisms to gain subsequent access are to provide another sample of the ICMetric or to break the cipher employed by the encryption technology.

the compromise of a system does not release sensitive ICMetric template data which would allow unauthorised access to other systems protected by the same ICMetric or indeed any system protected by any other ICMetric templates present.

tampering with the constitution of a circuit will cause its behaviour to change, potentially causing the features underlying the ICMetric to change, perhaps dramatically, thus causing the generated ICMetric to change. Consequently, a faulty or maliciously tampered device will be autonomously prevented from decrypting its own stored data or participating in any initiated secure communications, as the regenerated keys will differ from those created before its integrity was compromised. I.e. the ICMetrics approach can be made to fail securely and provide a very high immunity from cloning and tampering.

the removal of the need for the storage of the private key associated with the encryption system. This is a natural consequence of the system. Since the key will be uniquely associated with the given ICMetric sample, a further ICMetric sample may be used to regenerate the required private key. As there is no physical record of the key, it is not possible to compromise the security of sensitive data via unauthorised access to the key.

Concept

ICMetrics is a revolutionary new Trusted Computing approach that avoids storage of root-of-trust encryption keys by creating them on demand based on measurable properties and features of the computer system itself. ICMetrics may be considered as the computer equivalent of biometrics. However, unlike traditional biometrics, unique templates are not needed to create the final encryption key, so the approach is significantly more secure than conventional encryption techniques, including those incorporating biometrics.

Operation

The Template-Free technique employed by ICMetrics uses a novel normalisation and combination strategy to merge a series of metrics, which suitably represent one or more of the properties, features and behavioural characteristics of a computer, device or service, into a single all-encompassing value, which is the system's ICMetric. Suitably, the ICMetric architecture has three stages as shown in FIG. 1.

In the first stage, the component metrics are obtained using a monitoring infrastructure 102 that suitably employs a novel architecture in order to efficiently characterise the computer's behaviour while it operates normally. Following collection of measurement data, optimised pre-processing occurs in stage two 104, which extracts raw property and feature values and provides a consistent data format ready for final processing. In the final stage 106, custom normalisation and trimming techniques are employed to maximize the ICMetric's permutations and therefore security. The combination strategy employs advanced pattern recognition techniques that are generic to instances of a computer design, rather than individual templates; therefore it is infeasible to recreate the ICMetric for a specific computer or electronic device, without first capturing all of its many sample values that are only in existence when encryption is needed.

The primary purpose of the technology is thus to encrypt components of devices, systems or services using properties, or features, derived from their own construction and behaviour to form a digital signature capable of assuring both their authenticity and freedom from malware whilst simultaneously allowing the flexibility for them to operate within their designed specification and to execute on an arbitrary (i.e. any desired) platform. The ability to securely access services located online from a mobile device offers significant advantages for ease of provision and access to both existing and bespoke network-based services. However, such technology also presents significant challenges in assuring that the service accessed is authentic and free from any form of malware. The need to protect the integrity of each service has long been recognised, but the increasingly widespread adoption of network-based services raises new challenges, particularly where these services are communicating autonomously. Advantageously the measured features (or characteristics) need not remain absolutely constant but are free to vary, for example within deduced parameters. This allows the software to operate in several states and on a variety of differing platforms whilst still ensuring that any illegal clone or malware infecting the software is detected via unacceptable changes in the operating parameters. ICMetrics thus represents an exciting new approach for creating unique identifiers for software systems enabling the generation of unique digital signatures and potential secure encrypted communication between services.

A more detailed description of the operation of the system is as follows. In one implementation, the proposed ICMetric-based system is a two-phase system. Suitably the system comprises a calibration phase and an operation phase. Each phase may operate as follows.

Calibration Phase (This Phase is Suitably Applied Once Only Per Application Domain)

1. For each service: measure the desired feature value or values, for example one or more operating characteristic of the associated software and/or hardware.
2. Generate feature distributions for each feature illustrating the frequency of each occurrence of each discrete value, for example for each sample circuit. This allows the same digital signature to be generated from the normal variations of operation of the software concerned. It can also ensure any abnormal variation fails to generate the correct digital signature.
3. Normalise the feature distributions generating normalisation maps for each feature. These normalisation maps suitably relate the range of measured values for a given feature (such as a software system) to a fixed range of values chosen for that particular feature. The absolute values of features can thus be discarded, and abstract virtual values may suitably be chosen in their place.

Operation Phase (This Phase is Suitably Applied Each Time an Encryption Key is Desired for a Given Circuit)

1. Measure features for the given software and/or hardware system for which a digital signature (or an encryption key) is desired.
2. Apply the normalisation maps to generate values suitable for key generation.
3. Apply the key generation algorithm which combines the normalised feature values into a single key (termed the basis key).
4. Divide the basis key to form an asymmetric key pair (several techniques are possible to do this, as will be appreciated by the skilled person) which may then be employed to provide a digital signature for the service in question. This is suitably done by encrypting a digest of component data of the service. Alternatively or additionally the asymmetric key pair may be employed for secure communications in conjunction with the asymmetric key pair associated with another service.

The ICMetric system may be used in conjunction with a range of encryption algorithms. It is suitably independent of any particular encryption algorithm.

Figures 2A, 2B:
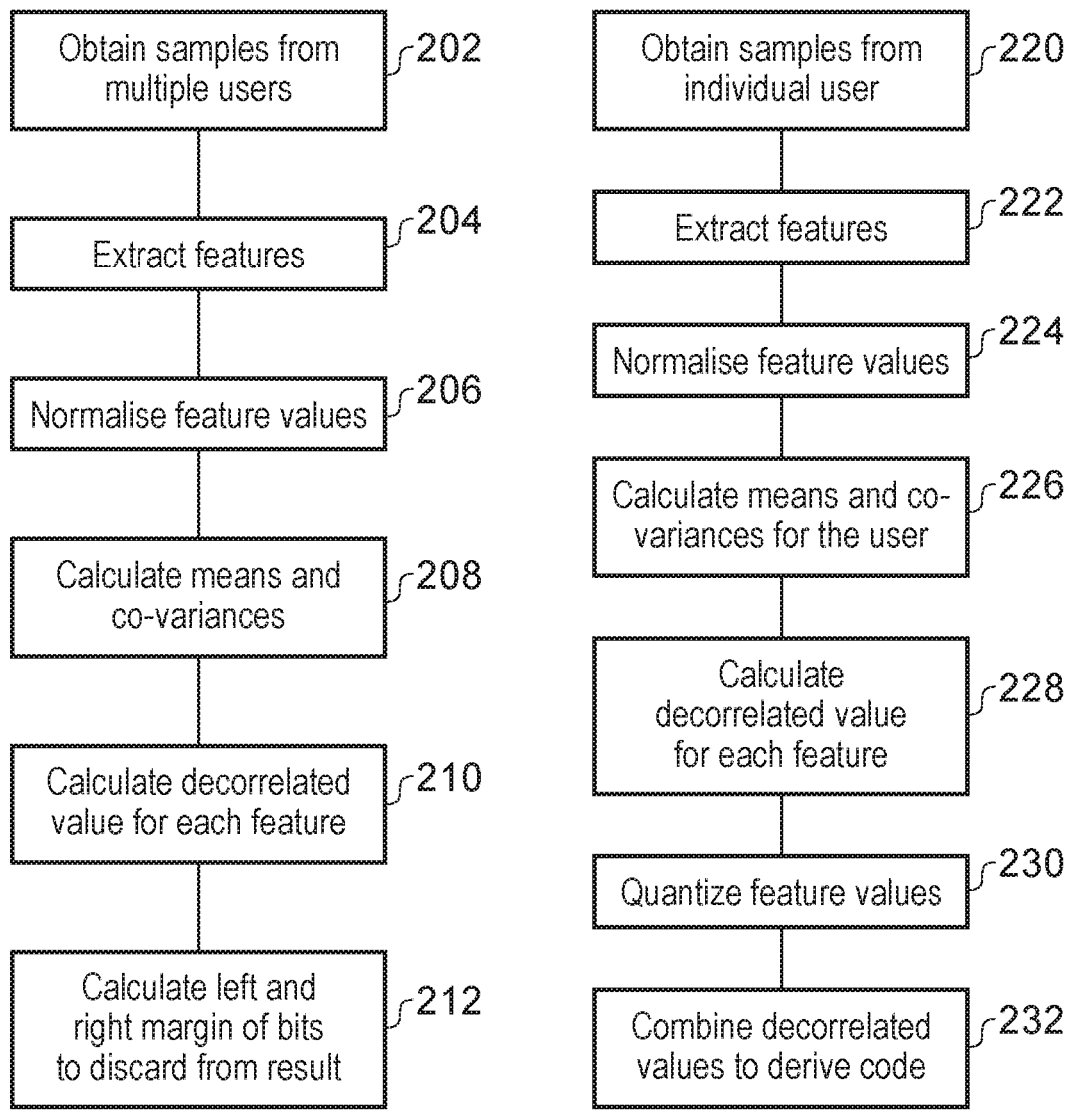
FIG. 2A illustrates a series of steps in a calibration phase of a key generation process.
FIG. 2B illustrates a series of steps in an operation phase of a key generation process.

The operation of the system may be as illustrated in FIG. 2. FIG. 2A illustrates the calibration phase. In this phase, samples are obtained from multiple users 202. Features are extracted from the samples 204. Feature values are then normalised 206. One or more mean and co-variance is calculated 208. Decorrelated values are then calculated for each feature 210. Left and right margins of bits to discard from the result are calculated 212. This latter step can aid in obfuscating the result, i.e. it will restrict the ability of an observer to recreate the value from which the result was obtained, or even to guess what feature the value relates to. FIG. 2B illustrates the operation phase. In this phase, samples are obtained from an individual user 220. Features are extracted from the sample 222 and normalised 224. Means and co-variances are calculated 226. A decorrelated value is calculated for each feature 228. Feature values are quantized 230. Decorrelated values are combined to derive a code 232.

Features

Device features may suitably be any one or more of the various characteristics of a specific device that can be used to differentiate it from other devices. They come in many forms, from specific hardware details to the habits of a device's user. These will be described in more detail below. Device features play an important role in the present approach to creating secure encryption keys. When current systems encrypt data, they must create and store templates of the generated encryption keys in order to decrypt the data at a later date. The use of device features as in the present approach extricates the encryption process from any need to store such templates. This can reduce or eliminate one of the largest problems in current systems.

If sufficient distinct features of a device can be gathered, it is possible to build a secure key for the device that is unique to that device, much in the same way that a human can be differentiated from anyone else if enough of their physical features are known. The features do not need to be recorded and stored as a template at any point during this process as they can be collected again each time the data requires decryption. Upon collection, a key can be generated and compared to the key that was generated during the calibration phrase of the encryption. Providing that this decryption is being conducted on the same specific device as that on which the encryption was carried out, and that the device has not been tampered with, the same device features can be collected and analyzed. This will result in the same key being produced, proving the device's authenticity. However if, for example, an unknown hacker were to either clone the application to another device or tamper with the original device's environment, a different key would be created and access to the data thereby denied.

As the features of a device are used to create the encryption key, the system's strength lies primarily on the selection of robust and diverse features. There are certain aspects of each feature that need to be considered in order to determine its adequacy. Firstly, features should be able to achieve a certain level of obfuscation, either innately or by conducting certain procedures on them. Suitably the core components that make up the key are as obscure as possible from potential hackers. This is because if even just a few features remain completely obscure, the key becomes almost impossible to fraudulently replicate. There are many ways to obscure features. These include creating composite features. Such composite features suitably record how certain device features interact with each other. Thus, where composite features are used, not only would the device features need to be discovered, but also their various interactions with each other.

The inter-sample variation of a feature describes its entropy and can be used to determine how valuable a feature will be at distinguishing devices apart. A good feature will have a high inter-sample variation and thus offer many potential values. An example of this is a simple serial number. This possesses a very high inter-sample variation, as each device's serial number is unique. Such serial numbers may however also possess a very low level of obfuscation. Accordingly a feature's positive and negative attributes must be considered as a whole during the feature selection process.

Figure 3:
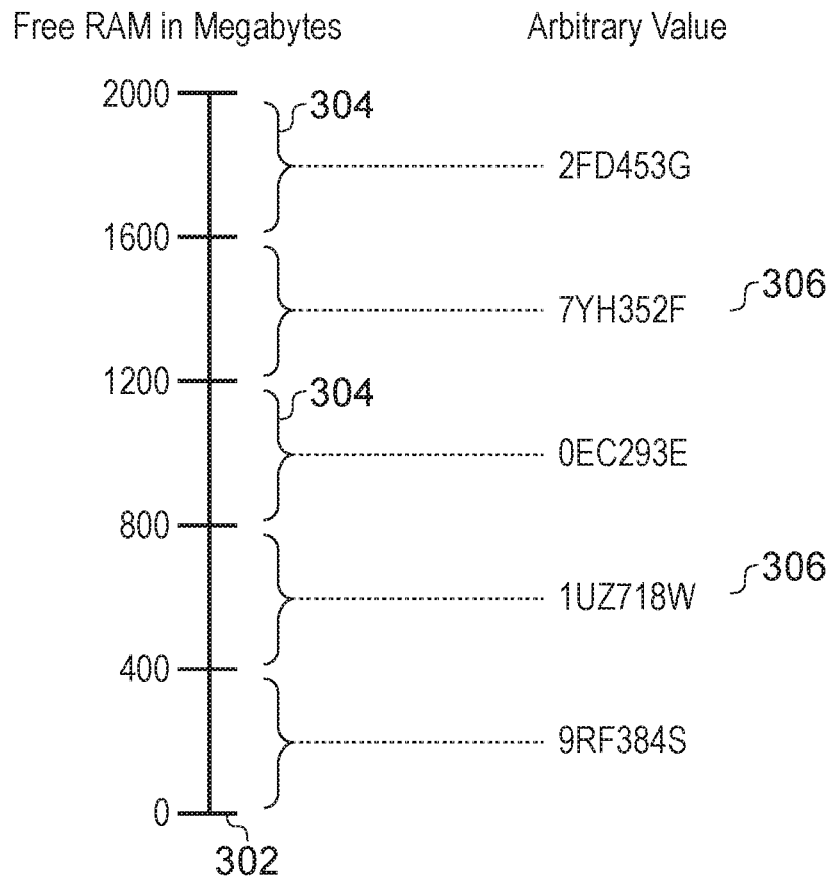
FIG. 3 shows a chart illustrating mapping various ranges of free RAM in a system to values.

Another aspect of ICMetric technology is that many features may produce values that are non-static, i.e. they may fluctuate as the device is used. An example of such a feature would be the current free RAM on the device. Another example is the current active RAM on the device. While the values of these examples should be quite stable, they will change when applications are opened (thus consuming RAM) or closed (freeing RAM up). Intra-sample variation describes how much these values change over the lifecycle of a device. FIG. 3 shows a chart illustrating various ranges of free RAM. At any one given time the device's current free RAM will reside somewhere along the axis 302 but will periodically move up and down. On its own this feature is likely to be too volatile to record over time. However it can be managed if ranges of values are created, which may be, for example as illustrated in FIG. 3, ranges of 400 MB. Differently-sized ranges may be used in some implementations. Each of these ranges 304 is mapped to an arbitrary value 306. Therefore as long as the feature stays within the range its resulting arbitrary value will stay the same. In order for the feature to be stable enough to use in this way its intra-sample variation must be as low as possible. Features with a high intra-sample variation fluctuate too much, meaning that they are likely to become difficult to map and ultimately unlikely to offer a persistent value to contribute to the key generation.

Example Features in Smartphones and Tablets

Network and Connectivity

Modern devices such as mobile devices are very sophisticated communication devices. They can permit powerful aggregation of data collected from their many sensors. Such devices typically comprise many different hardware elements designed for networking. This can permit a variety of features to be used for the ICMetric. For example, network data should be accessible. This can be useful even if some features may not individually have a particularly large entropy.

Is the device connected to the Internet?

It may be determined if a device is connected to a network such as the Internet, for example either via cellular and/or Wi-Fi. This is likely to be easy to access at the device as it is common practice to defensively code by checking for an Internet connection when a task is dependent on the presence of such a connection. This feature could be represented using a Boolean value to signify true and false, i.e. whether the device is connected or not.

Is the device connected to Wi-Fi?

This feature is similar to the check for Internet connectivity. This feature can distinguish between one device connected to the Internet through a cellular connection, such as LTE or 4G, and another device connected via Wi-Fi. This feature does not require internet connectivity to succeed.

Where one feature is searching for a WAN, the other is searching for a wireless LAN. Like the Internet connectivity feature, the result is expected to be a Boolean value. In general, the feature may search for, and optionally distinguish between, one or more wireless and/or wired connection.

Wi-Fi Name

The network name, for example a wireless network SSID, is a feature that is likely to be accessible through the network interface. Unlike the connectivity features already identified, this feature is not expected to use an asynchronous call back design for accessing the information. It is expected to be accessible using a public API which will offer similar information to the Wi-Fi connectivity feature, but with increased entropy and inter-sample variance. For example, a predetermined number of characters of the name may be utilised, for example the first 7 characters of the name. Each character may be converted to a 1-byte ASCII value and concatenated.

Bluetooth State

Another form of device communication is through Bluetooth. This is commonly found in modern mobile devices which makes it a good potential feature. An obvious test to is try and determine the Bluetooth state of the device, for example whether it is active or inactive. A subset these states may be determined, such as "connected", "connecting", "disconnecting", and "communicating". Suitably the Bluetooth technology, is assessed, for example to determine the Bluetooth version, and/or, if version 4 or higher is detected, if it implements Bluetooth LE (low energy). Another test would be attempting to measure the performance of the Bluetooth technology. This suitably comprises looking at the data, and the time it takes to measure, with the potential battery drain impacting the practicality of using some or all of these values as features, and the challenge in generating the value on demand. This feature may utilise callback functions when accessing the data.

Provision of VOIP

Where this feature is accessible at a device it is expected to provide a Boolean value that has a low intra-sample variance.

Network Usage

This feature comprises the amount of network traffic the device serves and/or consumes. The feature suitably comprises some context data like a timestamp or similar. Before reading the data it may not be known if this context data exists, or if there is just a large value signifying the amount of network data sent and/or consumed for an arbitrary duration. The representation of the data is suitably also considered. If the data representation is, for example, an unsigned 32-bit integer then the value would overflow at approximately 4 GB, which could be an entirely feasible limit to hit. Suitably a data representation is selected in dependence on expected data sizes to reduce the effect of data overflows. This can help make this feature more stable, and more suitable for use in the ICMetric system.

NFC

This feature is intended to be handled in much the same way as the Bluetooth testing. Both are short-range communication protocols and so can be treated in much the same way. Like Bluetooth, determining if NFC technology is present on the device and active, or if it is not active (or not on the device) are the two Boolean values to test looking at. If it is present, it can be determined if NFC-powered technology like Beam is present. It may also be possible to measure the performance. It is worth noting that a lot of older devices such as iPhones are not believed to have the capability to use NFC. This itself may be a way to distinguish some devices.

Permissions for Services Like GPS

It isn't just connectivity that a mobile device can now offer. Most devices house advanced geo-location features, for example accelerometer sensors and/or GPS hardware. One or more of these features are suitably tested. This can complement network connectivity features, such as by looking at correlations like the location of the device and the wireless network SSID. With a lot of service permissions being coupled with the usage of various sensors, and sensors being such a big part of the modern mobile device, these are a group of features that should be readily accessible and potentially offer some very interesting features and combinations of features. Callback functions are also a common implementation when using services like GPS.

Active Location Services

This feature involves testing to see if the location services on a device are active or not. This suitably provides a Boolean value as a result. This is relatively simple to implement as it would be common to code defensively to test for this condition before attempting to call code to perform a task which requires the location services to be active. Like any feature expected to be a Boolean value, the entropy is not going to be large. This feature may offer more possibilities when correlated with other features.

Position of Device in Form of Latitude and Longitude

Attempting to access the position, such as the longitude and latitude, of a device permits testing to see if the value can be accessed, and/or the time it takes to get a value, the accuracy of the value, and/or the sensitivity of the sensors used. An implementation using this feature is likely to need to register for notifications to updates to position. This may lead to authentication delays, which are undesirable in many situations (for example when a user is waiting for authentication to occur). The delay could be more significant if there is some caching involved in the process and requires some level of movement to get correct values. Longitude and latitude values may fluctuate without the device moving, which is a potential issue, depending on the accuracy of the values used for this feature. The values are generally very sensitive and will likely require a great deal of care handling and mapping them. Suitably the values may be truncated to remove some of the precision, and/or measured as a form of distance from an arbitrary point using a formula, like Haversine. Further, there is the potential for significant battery drain on the device if this value is used as part of the ICMetric system and key generation demanded frequently. The battery power level may also therefore need to be considered. In one implementation approximate location details and geofencing are utilised.

Identifiers for Services Like Internet and LAN

This subclass of features offers high inter-sample variance, which is a desirable quality for a candidate ICMetric system feature. A lot of these features are incredibly stable thanks to their low intra-sample variance which means it is easier to create mappings, but the values could need a high level of obfuscation as some of these are values that could be accessible through settings and documentation, and feature values that are measured can offer a higher level of protection against threats like spoofing.

Mac Address and Serial Number

Successful testing for accessing this feature will result in a low intra-sample variance feature with a high inter-sample variance. However, concerns exist about the accessibility of the value outside of the ICMetric system and subsequent opportunities for threats like spoofing. Values such as these may not be accessible on all platforms.

Open Port List

This feature refers to attempting to reference a list of open ports on the device. There is some uncertainty if there will be much inter-sample variance if users cannot open ports manually, similar to how they can open them on computers using a firewall. There are also generally fewer services running on devices like tablet computers such as iPads and there may be fewer ports open than on a traditional computer. This is another feature that may not always be accessible.

IP Address

The IP address is a feature that could be tightly coupled to the Wi-Fi name feature. It is expected to use the local address when connected to Wi-Fi and so should offer better inter-sample variance whilst having a similar intra-sample variance. In regards to accessibility, it is expected to be as protected as the Wi-Fi name feature, whilst also sharing the implementation techniques. Testing will simply be attempting to read the current IP address. In one example, the decimal points may be removed to take the address as one whole value. This value may then be obfuscated and mapped.

Memory and Application Usage

Another feature that is expected to be accessible is memory and active processes (such as the number of active processes). Memory can be very volatile and could be difficult to map individually but that also means it is likely to possess a strong entropy and have a potentially high inter-sample variance, both of which are desirable qualities for a candidate feature. Testing values for memory and processes may reveal useful correlated values which are expected to be naturally highly obfuscated and difficult to spoof. Another strong case for using features like these in an ICMetric system is the ability to offer an early warning of potential malware in the system when the normal operating parameters vary beyond an acceptable level.

Memory

Memory is a feature that is expected to be very unpredictable but possess high entropy. It is not expected to cause accessibility problems as great as those as some other features (from the perspective of privacy). There may be, however, the challenge of finding the same memory values for different platforms. With so many different memory values prevalent in the system, initial testing will identify what memory values are actually accessible with public APIs. For example, Android is likely to reference the proc/meminfo structure, but that is not expected to be available on iOS, although it is likely that common memory values like active memory and free memory will be available for all platforms.

Processes

There is a lot of information that can be gathered by looking at the various processes, either applications, background services, or OS-dependant activities, running on the system. For example, the names of the different processes that are currently running may be determined. There is a greater risk of inaccessibility with process information than memory when it comes to privacy issues as processes are more identifiable with regards to what the user is doing.

Disk Read and Write

Another feature is the performance of the disk when reading and writing. This feature can include how much data gets read and/or written for context in the measurement, but this could potentially be a feature value in itself. The storage could be external or internal, and promising disk performance values for devices that can read and write different amounts depending on the active processes can offer features with high inter-sample variance, but are stable enough to exhibit low intra-sample variance. There might also be some interesting correlations between performance and system configurations represented by other features.

Benchmarking

The measurement of the performance for features has already been noted as a potentially useful feature, and performance can be a feature not directly linked to any one specific feature. Testing the execution of operations, in a stress-controlled environment, for problems like unsorted arrays, rendering graphics to screen, solving mathematical problems like generating prime numbers, and/or hashing and encryption is hoped to produce low intra-sample variance. For identical devices it might be required to measure at a very low level to achieve a high inter-sample variance. Like memory, a change in the normal operating parameters of the system could have an impact on this feature making it another good example of a feature that demonstrates the benefits an ICMetric system can offer, like malware-implicit detection.

Containers

Containers, or software containers, can be used in systems to package together software such as a software application with the resources that it needs to run. Such resources can include the code and any referenced libraries and/or tools, for example system libraries and/or tools. The advantages of this approach are that the software can run consistently, independent of the environment in which it is to be run. This approach implements an operating-system-level virtualisation scheme. This permits the provision of a plurality of instances, i.e. the containers, to be run, which can be isolated from one other. An example of a type of container system is the Docker system.

Attributes of containers, and/or of container systems, can be used in the present techniques. For example CPU features, memory features, and/or network features can be used.

CPU features can provide information on the CPU statistics of the container, for example the Docker container. Information can suitably be derived or obtained from, for example, one or more of cpu_stats/system_cpu_usage, cpu_stats/cpu_usage/percpu_usage/1, and precpu_stats/system_cpu_usage.

Memory features can provide information on memory-related statistics of the container, for example the Docker container. Information can suitably be derived or obtained from, for example, one or more of memory_stats/max_usage, memory_stats/stats/active_file, memory_stats/stats/6_inactive_file, and memory_stats/stats/pgpgin.

Network-related statistics can be revealed from, for example, the networks category of data obtainable from containers such as Docker containers. Information can suitably be derived or obtained from, for example, one or more of networks/eth0/rx_bytes, networks/eth0/tx_packets, and network_settings/sandboxed.

Hardware

The modern mobile device is made up of various hardware components, and properties of these components are expected to remain consistent for a long period of time. There is also the belief that mass-produced hardware is never made identical, and low-level metrics can have the possibility of identifying distinctions between their builds. Over a combination of a number of hardware features it is expected that high inter-sample variance may be exhibited, with the consistency offered by hardware components allowing for low intra-sample variance. Hardware features are not as susceptible to user interference and, with the hardware components effectively making up the device, can be said to have a strong association with a device. A lot of devices share similar hardware but the accessibility could be quite difficult.

Hardware Architecture

When testing for features relating to the architecture of the hardware, it is more about a description of the various hardware components like the number of CPUs, the manufacturer, board name, and/or model rather than data that can be generated through analysis and performance for such features. Many of these features are expected to be static, meaning a low intra-sample variance. However, the features may be less useful regarding inter-sample variance when two devices are of similar models.

Power

This feature suitably refers to the battery of the device. There is a possibility that this feature value could appear arbitrary and take any form between empty (0) and full (1) at anytime. This feature suitably is able to identify information like which users regularly charge devices or devices which don't operate under heavy usage through values that do not drop below a certain threshold. Power data suitably helps to infer stress level on the device and potential heavy usage.

Battery Level

The battery charge and discharge profiles are potential features that are accessible. This can be tested by reading for a value to represent the power remaining in the device, or to read it a number of times to measure the amount used over a short period of time. For the latter to prove useful it is likely that the device would need to be under considerable stress, or that the granularity of the power measurement is small enough to detect changes that would otherwise be undetectable. If patterns are followed, like charging every night, then it might be possible to imply information like heavy usage in the morning but even if this was possible, the usefulness of this feature as a distinguishing feature is likely to be dependent on when a device key is requested.

Temperature

Hardware temperature can change and as a general rule of thumb the higher the stress level, the warmer the hardware gets. The efficiency of each individual battery coupled with the level of activity could possibly result in individual temperature profiles.

Power Status

The status of a power source refers to whether it is charging, unplugged, or plugged in but not charging.

Battery Health

This feature involves testing for information relating, for example, to how old the battery is, and/or the amount of power it can produce on a full charge. This feature can comprise estimated life-expectancy and (assuming a rechargeable battery) a number of recharges. This feature may comprise an indication of the battery type.

Camera and MEMS Sensors

Another potentially useful feature is based on the device sensors. Attempting to analyse the sensitivity and quality of individual sensors on the device can produce very promising features. It can be determined what sensors exist on the device, and what information is accessible for any sensor found on the device. This feature suitably comprises analysing what the sensor(s) produce. One example is performing audio analysis on files created by using the microphone, like voice memos. Another example is performing image analysis on files created by using the camera. Another example is analysing the manufacturing-dependent bias on MEMS sensors such as accelerometers and gyroscopes.

Other Device Features

Another potentially useful feature is an embedded system within a particular device, and/or an Internet of Things device feature. Such device features can exhibit device-specific biases. For example, a device-specific bias can be exhibited in MEMS sensors. These biases can be used to identify individual sensors. This can apply to sensors including accelerometers, gyroscopes and other types of MEMS sensors. This is particularly useful where the device biases are device-specific, and are for example introduced during a manufacturing process and/or previous use of the device. The device biases need not be unique to a particular device. The fewer the number of that type of device that exhibit the same device bias, the better this feature is likely to be in the implementations discussed herein.

Similarly, the practical implementation of random number generators, such as true random number generators, in semiconductor chips may result in a device-specific signature or bias that can be utilised as a feature.

User-Specific Features

Media Files, for Example Images and Video Files

Looking at the graphic media a user stores on their device offers the opportunity to perform image and video data analysis on very different data that is not expected to change regularly. It is related and accessible to the device, but uses the fact that the data is defined by a unique user that allows it to exhibit small intra-sample variance but large inter-sample variance along with good entropy. As an example, the 5 oldest images and videos found on the device could be analysed. Analysis on images taken by the device offers the additional advantage of inferring information about the quality of the camera on the device as well. It is worth noting that there is expected to be a good deal of meta-information about the files without the need to perform any advanced analysis techniques as well, including information like the location an image was taken.

Contacts

Potential features relating to user contacts will involve accessing the contact list of the device. There is a large scope with what can be done with this data, depending on what information is used. Strings like first name, surname, and email could potentially deliver high inter-sample variance when device owners have no connection to one another. Contacts can also be filtered on any of the existing data if needed, so reading not just the total number of contacts but also the number of contacts with first name starting with a particular character, such as the character 'r', to add more potential values, inter-sample variance, and entropy.

Device Access

Useful features might be found when testing for the frequency or pattern (suitably including numeric and non-numeric codes) for either logging in, or simply accessing the device using the touchscreen.

Telephony

This feature focusses on accessing data relating to phone calls made by the device, and general cellular information like SIM data.

Network Code and ISO/Country Code from Cellular Provider

Reading the cellular provider codes relating to SIM information is possible. These are expected to be static values. This is a feature that will likely exhibit a low intra-sample variance but is not expected to have a high inter-sample variance or particularly high entropy.

Other examples of potential features comprise one or more of the following:

Activities—Information on the current top activity.
Bookmarks—Browsing history and saved webpages.
Cache—Memory allocated to application and system caches.
Calendar—Read events, reminders and attendees.
Call Logs—Name, number, duration and type of calls made from and to the device.
Contacts—Information including name, number, e-mail, photo, relationship etc.
Location—Address and GPS information.
Hardware—Details and statistics from the Camera, CPU, RAM and Storage.
Media—Details of user content including images, music and videos on the device.
Networking—Type and state of connected networks.
Operating System—Running process and memory usages.
Sensors—Name, power, range type and resolution information for sensors present.
Settings—Global system-level device preferences.
Wi-Fi—Status, configuration and security of configured networks and currently active Wi-Fi network.

Software Features

Embodiment of Software Based Features

To identify suitable software-based features to identify a service, the following example is given of a website that displays all the primes up to the value of 2500. In the example, features are read from this example site in an attempt to determine the usefulness of candidate features. Features will be taken from two servers, one representing an authenticate server, the other acting as a spoof site. Software-based features try to take advantage of the fact there is no default wrong way to implement a function. There can be relatively better approaches, like a more efficient use of memory, but if the function works as intended then there are an almost infinite amount of ways the solution can be created. Even if the result looks identical between two functions, the operating parameters can be different between the two. This can be tested by creating pseudo-sites that serve up web content to local machines on the LAN. One will be implemented as a valid server. The other utilises alternative code to represent a malicious spoofing attempt. The two sites were analysed to see if discrepancies in how the sites operate could be detected.

Code Complexity

One of the first features investigated was an analysis of the code complexity. This involves evaluating the cost of the algorithm(s) used in the implementation, i.e. looking at the operations undertaken and the amount of looping needed to get a result, as well as parsing the source on the server to track how many different branches can be traversed. Even though both implementations for generating prime numbers in this example use the sieve technique, the additional optimisers that were not contained in the spoof code resulted in a difference of complexity between the two source files.

For this example, a container was created with all the values to sieve, and even at this early stage, the total number of potential primes to test has been halved as the valid server's implementation has the number 2 as its only even value.

Valid server: total number of values to check=n/2 (where n is 2500 in our example).
Spoof server: total number of values to check=n (where n is 2500 in our example).

This immediately halves the number of loops made in the outer loop further in the calculation. A further optimisation, in the authentic server, is made on the outer loop where it breaks out of the loop once the current prime for sieving is greater than the square root of 2500. The actual instruction used to check if a value is prime, or if it should be removed from the container is also handled differently between the two implementations. The genuine server simply counts along the array to sieve away any number divisible by the current prime until the maximum value, 2500 in this case, has been reached. In contrast, the spoof server checks against every value in the container that is larger than the current prime, determining if it needs to be removed by employing the expensive modulo operation (current prime % next value>prime in container), all the way until the end of the container is reached.

The result is the main server only has to move position in the container to remove a non-prime value a total of 3956 times before sieving is complete, but the other PHP sieve implementation on the spoof server performs 496688 evaluations before it completes, and each evaluation is computationally more expensive than simply moving a number of positions along a container.

Analysis of the software source is one way to determine the complexity of the implementations, but another is to measure the execution time. This is a difficult task to accomplish as the time taken to execute instructions on the server will be affected by other processes on the system. In order to mitigate the effect other resources and system overhead on the server have on the variance of a feature value, a more accurate measurement of execution time, specific only to the actual feature rather than the system as a whole needs to be found. One option would be the time a process was actually utilising the CPU as opposed to the amount of real time passing between the two time stamps. This permits a more accurate determination of the time of the actual operation rather than all the different actions that were running during the time period recorded.

ICMetric Key Generation

Generating an ICMetric key is a lightweight process that firstly involves the gathering of feature values from the device. The features are then combined into categories, which go through the normalisation algorithm. This suitably obfuscates and/or normalises the categories into words of a set length. The generated words are then used to produce an un-hashed ICMetric key via the secret sharing algorithm discussed in more detail below. The ICMetric key is then employed in any of the protocols outlined below. The algorithm takes into account the maximum error tolerance and, if the feature values that were measured meet the minimum tolerance, then the correct key will be regenerated. An illustrative description of how the key is generated for the developed demonstrator provides a detailed example of the key generation process, using a small number of straightforward features to provide a clear illustration of the process. A number of high-level, user-dependent features are extracted and analysed for developing the ICMetrics-based system. The following steps are carried out to generate the key in a smartphone based embodiment:

Step 1: Define Feature Categories

By concatenating the selected features, four different feature categories were defined. The purpose was to combine those features that fall in a specific class/category.

TABLE 1

Feature Category 1

| Feature Name | Free Bits | Mobile Country Code | Mobile Network Code | ISO Country Code |
|---|---|---|---|---|
| Range | N/A | 0-999 | 0-999 | AA-ZZ |
| Required Bits | 28 | 10 | 10 | 16 |

Category 1 (as shown in table 1) is related to a device's network configuration with the mobile country code and the mobile network code being used in combination to uniquely identify the device's carrier. The mobile country code and the ISO country code are fully dependent on one another whereas the mobile country code and the mobile network code are independent.

TABLE 2

Feature Category 2

| Feature Name | Free Bits | Allows VOIP | Bluetooth Active | Location Services | Wi-Fi Connected | Internet Connected | Wi-Fi SSID |
|---|---|---|---|---|---|---|---|
| Range | N/A | 0-1 | 0-1 | 0-1 | 0-1 | 0-1 | First 7 Characters |
| Required Bits | 3 | 1 | 1 | 1 | 1 | 1 | 56 |

Category 2 (as shown in table 2) is related to the connectivity of a device and most of the features are a binomial value that dictates the states of the features. The practical entropy is mostly dependent on the knowledge of the Wi-Fi SSID that the device is connected to and although any possible SSID is available, common names are more likely to occur.

TABLE 3

Feature Category 3

| Feature Name | Free Bits | Number of Contacts | Number of Contacts First Name starting with 'S' | Number of Contacts First Name starting with 'M' |
|---|---|---|---|---|
| Range | N/A | 0-4095 | 0-1023 | 0-1023 |
| Required Bits | 32 | 12 | 10 | 10 |

Category 3 (shown in table 3) is based on the contacts on the devices and randomly associated filters on the contacts. In the simple example above the contacts are filtered by the first letters of the first and second name of the contact.

TABLE 4

Feature Category 4

| Feature Name | Image File Size (Bytes) | Image Orientation | Image Height | Image Width |
|---|---|---|---|---|
| Range | 0-4294967295 | 0-15 | 0-16383 | 0-16383 |
| Required Bits | 32 | 4 | 14 | 14 |

Category 4 (shown in table 4) is based on the media that is saved on the device; which in this case is an arbitrary image. This category can be re-used with multiple images, in this example it is used twice as Category 4A and 4B, each based on a different image.

Step 2: Fixed Masking

To perform data confusion and diffusion, we performed XOR operations between each 64-bit feature category word and a pre-defined mask. Assume that:

V=Feature category 1 word consisting of 8 bytes $v_1$ (LSB), $v_2$, $v_3$, $v_4$, $v_5$, $v_6$, $v_7$, $v_8$ (MSB)

W=Feature category 2 word consisting of 8 bytes $w_1$ (LSB), $w_2$, $w_3$, $w_4$, $w_5$, $w_6$, $w_7$, $w_8$ (MSB)

X=Feature category 3 word consisting of 8 bytes $x_1$ (LSB), $x_2$, $x_3$, $x_4$, $x_5$, $x_6$, $x_7$, $x_8$ (MSB)

Y=Feature category 4A word consisting of 8 bytes $y_1$ (LSB), $y_2$, $y_3$, $y_4$, $y_5$, $y_6$, $y_7$, $y_8$ (MSB)

Z=Feature category 4B word consisting of 8 bytes $z_1$ (LSB), $z_2$, $z_3$, $z_4$, $z_5$, $z_6$, $z_7$, $z_8$ (MSB)

where (MSB) stands for most significant byte and (LSB) is the least significant byte.

The feature matrix can then be defined as:

$$\text{Feature Matrix} = \begin{bmatrix} V \\ W \\ X \\ Y \\ Z \end{bmatrix} = \begin{bmatrix} v_8 & v_7 & v_6 & v_5 & v_4 & v_3 & v_2 & v_1 \\ w_8 & w_7 & w_6 & w_5 & w_4 & w_3 & w_2 & w_1 \\ x_8 & x_7 & x_6 & x_5 & x_4 & x_3 & x_2 & x_1 \\ y_8 & y_7 & y_6 & y_5 & y_4 & y_3 & y_2 & y_1 \\ z_8 & z_7 & z_6 & z_5 & z_4 & z_3 & z_2 & z_1 \end{bmatrix}$$

The following arbitrarily chosen pre-defined mask (each row is 64-bit) can be utilised:

$$\text{Fixed Mask} = \begin{bmatrix} A \\ B \\ C \\ D \\ E \end{bmatrix} = \begin{bmatrix} a_8 & a_7 & a_6 & a_5 & a_4 & a_3 & a_2 & a_1 \\ b_8 & b_7 & b_6 & b_5 & b_4 & b_3 & b_2 & b_1 \\ c_8 & c_7 & c_6 & c_5 & c_4 & c_3 & c_2 & c_1 \\ d_8 & d_7 & d_6 & d_5 & d_4 & d_3 & d_2 & d_1 \\ e_8 & e_7 & e_6 & e_5 & e_4 & e_3 & e_2 & e_1 \end{bmatrix}$$

where

A=Mask for feature category 1 consisting of 8 bytes $a_1$ (LSB), $a_2$, $a_3$, $a_4$, $a_5$, $a_6$, $a_7$, $a_8$ (MSB)

B=Mask for feature category 2 consisting of 8 bytes $b_1$ (LSB), $b_2$, $b_3$, $b_4$, $b_5$, $b_6$, $b_7$, $b_8$ (MSB)

C=Mask for feature category 3 consisting of 8 bytes $c_1$ (LSB), $c_2$, $c_3$, $c_4$, $c_5$, $c_6$, $c_7$, $c_8$ (MSB)

D=Mask for feature category 4A consisting of 8 bytes $d_1$ (LSB), $d_2$, $d_3$, $d_4$, $d_5$, $d_6$, $d_7$, $d_8$ (MSB)

E=Mask for feature category 4B consisting of 8 bytes $e_1$ (LSB), $e_2$, $e_3$, $e_4$, $e_5$, $e_6$, $e_7$, $e_8$ (MSB)

Arbitrarily chosen values were then assigned to the elements of the Fixed Mask matrix for achieving data obfuscation:

$$\text{Fixed Mask} = \begin{bmatrix} A \\ B \\ C \\ D \\ E \end{bmatrix} =$$

$$\begin{bmatrix} 0\times 0F & 0\times 0E & 0\times 0D & 0\times 0C & 0\times 0B & 0\times 0A & 0\times 09 & 0\times 08 \\ 0\times 80 & 0\times 90 & 0\times A0 & 0\times B0 & 0\times C0 & 0\times D0 & 0\times E0 & 0\times F0 \\ 0\times 99 & 0\times 88 & 0\times 77 & 0\times 66 & 0\times 55 & 0\times 44 & 0\times 33 & 0\times 22 \\ 0\times FF & 0\times FA & 0\times FB & 0\times FC & 0\times 01 & 0\times 02 & 0\times 03 & 0\times 04 \\ 0\times 40 & 0\times 80 & 0\times A0 & 0\times F0 & 0\times 59 & 0\times 95 & 0\times 29 & 0\times 92 \end{bmatrix}$$

Finally, bit-wise XOR operations were performed between the Feature Matrix and Fixed Mask matrices to obtain an XORED matrix:

$$\text{XORED} =$$

$$\text{Feature Matrix Mask} \oplus \text{Mask} = \begin{bmatrix} v'_8 & v'_7 & v'_6 & v'_5 & v'_4 & v'_3 & v'_2 & v'_1 \\ w'_8 & w'_7 & w'_6 & w'_5 & w'_4 & w'_3 & w'_2 & w'_1 \\ x'_8 & x'_7 & x'_6 & x'_5 & x'_4 & x'_3 & x'_2 & x'_1 \\ y'_8 & y'_7 & y'_6 & y'_5 & y'_4 & y'_3 & y'_2 & y'_1 \\ z'_8 & z'_7 & z'_6 & z'_5 & z'_4 & z'_3 & z'_2 & z'_1 \end{bmatrix},$$

where matrix elements with a dash on top denote the modified bytes after the XOR operation.

Step 3: Confusion/Byte Jumbling

In this step, bytes in each feature category word were jumbled, again to achieve data obfuscation. Alternative techniques for achieving data obfuscation are possible, as will be appreciated by the skilled person. The first row and the fifth row of the XORED matrix were given a circular 1-byte left shift individually; the second row was given a circular left shift of 3 bytes. Similarly, circular left shift operations of 2 bytes and 4 bytes were performed on the third and the fourth rows respectively. This may be expressed mathematically as:

$$\text{JUMBLED} = \begin{bmatrix} v'_7 & v'_6 & v'_5 & v'_4 & v'_3 & v'_2 & v'_1 & v'_8 \\ w'_5 & w'_4 & w'_3 & w'_2 & w'_1 & w'_8 & w'_7 & w'_6 \\ x'_6 & x'_5 & x'_4 & x'_3 & x'_2 & x'_1 & x'_8 & x'_7 \\ y'_4 & y'_3 & y'_2 & y'_1 & y'_8 & y'_7 & y'_6 & y'_5 \\ z'_7 & z'_6 & z'_5 & z'_4 & z'_3 & z'_2 & z'_1 & z'_8 \end{bmatrix}$$

Step 4: Dynamic Masking Through XOR Operations

As opposed to Step 2, where a pre-defined and fixed mask were utilized, dynamic masking of the JUMBLED matrix was performed in this step. This was achieved by carrying out bitwise XOR operations on specific elements (bytes) of the JUMBLED matrix while using some particular elements (bytes) as mask. Mathematically, it may be written as:

$$DM1 =$$

$$\begin{bmatrix} v'_7 \oplus v'_6 & v'_6 & v'_5 \oplus v'_4 & v'_4 & v'_3 \oplus v'_2 & v'_2 & v'_1 \oplus v'_8 & v'_8 \\ w'_5 \oplus w'_3 & w'_4 \oplus w'_2 & w'_3 & w'_2 & w'_1 \oplus w'_7 & w'_8 \oplus w'_6 & w'_7 & w'_6 \\ x'_6 \oplus x'_3 & x'_5 \oplus x'_2 & x'_4 \oplus x'_1 & x'_3 & x'_2 & x'_1 & x'_8 \oplus x'_7 & x'_7 \\ y'_4 \oplus y'_8 & y'_3 \oplus y'_7 & y'_2 \oplus y'_6 & y'_1 \oplus y'_5 & y'_8 & y'_7 & y'_6 & y'_5 \\ z'_7 \oplus z'_8 & z'_6 \oplus z'_1 & z'_5 \oplus z'_2 & z'_4 \oplus z'_3 & z'_3 & z'_2 & z'_1 & z'_8 \end{bmatrix}$$

This may be re-written as:

$$DM1 = \begin{bmatrix} m_{11} & m_{12} & m_{13} & m_{14} & m_{15} & m_{16} & m_{17} & m_{18} \\ m_{21} & m_{22} & m_{23} & m_{24} & m_{25} & m_{26} & m_{27} & m_{28} \\ m_{31} & m_{32} & m_{33} & m_{34} & m_{35} & m_{36} & m_{37} & m_{38} \\ m_{41} & m_{42} & m_{43} & m_{44} & m_{45} & m_{46} & m_{47} & m_{48} \\ m_{51} & m_{52} & m_{53} & m_{54} & m_{55} & m_{56} & m_{57} & m_{58} \end{bmatrix}$$

Step 5: Dynamic Masking Through XNOR Operations

Similar to Step 5, we again performed dynamic masking of the DM1 matrix to achieve more data obfuscation. This was achieved by carrying out bitwise XNOR operations on specific elements (bytes) of the DM1 matrix while using some particular elements (bytes) as mask. This may be written mathematically as:

$$DM2 = \begin{bmatrix} m_{11} & \overline{m_{12} \oplus m_{11}} & m_{13} & \overline{m_{14} \oplus m_{13}} & m_{15} & \overline{m_{16} \oplus m_{15}} & m_{17} & \overline{m_{18} \oplus m_{17}} \\ m_{21} & m_{22} & \overline{m_{23} \oplus m_{21}} & \overline{m_{24} \oplus m_{22}} & m_{25} & m_{26} & \overline{m_{27} \oplus m_{25}} & \overline{m_{28} \oplus m_{26}} \\ m_{31} & m_{32} & m_{33} & \overline{m_{34} \oplus m_{31}} & \overline{m_{35} \oplus m_{32}} & \overline{m_{36} \oplus m_{33}} & m_{37} & \overline{m_{38} \oplus m_{37}} \\ m_{41} & m_{42} & m_{43} & m_{44} & \overline{m_{45} \oplus m_{41}} & \overline{m_{46} \oplus m_{42}} & \overline{m_{47} \oplus m_{43}} & \overline{m_{48} \oplus m_{44}} \\ m_{51} & m_{52} & m_{53} & m_{54} & \overline{m_{55} \oplus m_{54}} & \overline{m_{56} \oplus m_{53}} & \overline{m_{57} \oplus m_{52}} & \overline{m_{58} \oplus m_{51}} \end{bmatrix}$$

Example of an ICMetrics-Based System

To demonstrate the utility of the present system, a rather simplified practical example will now be discussed. The system is simplified in this example for conciseness only; a practical system would be implemented analogously but with an increased range of features to ensure sufficient entropy. The operating principles would be as stated however. The data for this example was captured from a smartphone. Table 5 lists the values of different features that were available in this example.

TABLE 5

Feature values captured from a test device

| Sr. No. | Features |
|---|---|
| | Features values for Category 1 |
| 1. | Mobile Country Code = 234 (for the UK) |
| 2. | Mobile Network Code = 15 (for Vodafone UK) |

TABLE 5-continued

Feature values captured from a test device

Sr. No. Features

3. ISO Country Code = 26466 (Note that GB = (0110 0111 0110 0010) = 26466)

Features values for Category 2

1. VOIP Allowed
2. Bluetooth Activated
3. Location Services ON
4. Not Connected to WI-FI
5. Connected to the Internet
6. Name of WI-FI = 0

Features values for Category 3

1. Number of Contacts = 3328
2. Number of Contacts with the First Name starting with 'S' = 100
3. Number of Contacts with the Last Name starting with 'M' = 50

Features values for Category 4A

1. File Size for Image5 = 1826963 bytes
2. Orientation for Image5 = 1
3. Height of Image5 = 1936
4. Width of Image5 = 2592

Features values for Category 4B

1. File Size for Image20 = 1410005 bytes
2. Orientation for Image20 = 1
3. Height of Image20 = 1936
4. Width of Image20 = 2592

The algorithm described above was applied to these feature values and five 64-bit mini-ICMetrics (for the key) were generated. The output of each step of our algorithm for these specific feature values is given below. These results authenticate the validity of the present system and demonstrate its utility.

STEP1 OUTPUT
  CATEGORY1 mini-ICMetrics: 0x3A80F6762
  CATEGORY2 mini-ICMetrics: 0x1D 000000000000000
  CATEGORY3 mini-ICMetrics: 0xD00019032
  CATEGORY4A mini-ICMetrics: 0x1BE09311E40A20
  CATEGORY4B mini-ICMetrics: 0x15830511E40A20
STEP2 OUTPUT
  CATEGORY1 mini-ICMetrics: 0xF0E0D0FA3056E6A
  CATEGORY2 mini-ICMetrics: 0x9D90A0B000D0E0F0
  CATEGORY3 mini-ICMetrics: 0x998877668545A310
  CATEGORY4A mini-ICMetrics: 0xFFE11B6F10E60924
  CATEGORY4B mini-ICMetrics: 0x40952325487123B2
STEP3 OUTPUT
  CATEGORY1 mini-ICMetrics: 0xE0D0FA3056E6A0F
  CATEGORY2 mini-ICMetrics: 0xB0C0D0E0F09D90A0
  CATEGORY3 mini-ICMetrics: 0x77668545A3109988
  CATEGORY4A mini-ICMetrics: 0x10E60924FFE11B6F
  CATEGORY4B mini-ICMetrics: 0x952325487123B240
STEP4 OUTPUT
  CATEGORY1 mini-ICMetrics: 0x30DACA36B6E650F
  CATEGORY2 mini-ICMetrics: 0x6020D0E0603D90A0
  CATEGORY3 mini-ICMetrics: 0x32C59545A3101188
  CATEGORY4A mini-ICMetrics: 0EF07124BFFE11B6F
  CATEGORY4B mini-ICMetrics: 0xD59106397123B240
STEP5 OUTPUT
  CATEGORY1 mini-ICMetrics: 0x3F1ACF06BFA6595
  CATEGORY2 mini-ICMetrics: 0x60204F3F603D0F62
  CATEGORY3 mini-ICMetrics: 0x32C59588997A1166
  CATEGORY4A mini-ICMetrics: 0xEF07124BEF19F6DB
  CATEGORY4B mini-ICMetrics: 0xD5910639B7DADC6A Using the secret sharing principle introduced above (and discussed in more length below), the mini-ICMetrics generated above are used to generate the ICMetric key. The first time the code is generated is the calibration phase. In this phase, the tolerance in the number of mini-ICMetrics needed for subsequent generation of the ICMetric key can be selected. In this example, the tolerance is selected to be three, meaning that at least three correct mini-ICMetrics (out of the five in this example) will be needed. The second step requires a polynomial of degree (or order) one less than the tolerance; thus in this example a polynomial of order 2 is generated. The following quadratic polynomial is securely randomly generated:

$$f(x)=Ax^2+Bx+C$$

where:
A=0xC7E89F70CA98124A
B=0x316C5A6CA8173E13
C=0xAF7A0C8AC9818F34145AC613E13D24A4
Function Output
  CATEGORY1:
  0xB3516CE6DC080134577CAB3225CD9BC5
  CATEGORY2:
  0x10D19620C02F1CD1254DDF25E14385B3E
  CATEGORY3:
  0xE0ED155FD15E5BFA765B49E918BF56B2
  CATEGORY4A:
  0x1984744F54AF7C2F61F67471E20854233
  CATEGORY4B:
  0x17F7AFFA1C5331D02F66B98C5F1165726

The C value in the polynomial is the Y-axis intercept and is used as the un-hashed ICMetric key. More generally the secure key is suitably a function of the polynomial, such as a function of the polynomial at a predetermined location. In one example the predetermined located can be where the polynomial crosses the Y-axis. The category words are used as the function arguments. The function outputs are the corresponding Y values for the inputs; these are stored on the device, whereas the polynomial and the category mini-ICMetrics need not be stored, and are suitably discarded, which can enhance data security. The stored values on their own cannot be used to reproduce the ICMetric key as alone they cannot be used to interpolate a polynomial without a corresponding X co-ordinate. During the operation phase when the ICMetric key is required, the category mini-ICMetrics will be recreated as described above using measured features of the device, and as long as the minimum number of categories are correct (three in this example: the tolerance value), they can be combined with the stored values to create the co-ordinates that can be interpolated to reproduce the function above and thus regenerate the ICMetric key.

In this example to generate an ICMetric key, the categories are combined to produce a key with a 256-bit key with theoretical entropy of up to $2^{135}$ unique values. The example given here gives specific examples for features that can be easily altered to create more complex categories with higher entropy. For example, Category 2 could use more characters of the Wi-Fi SSID, Category 3 could use a combination of contacts or use a variety of different filters based on other aspects of the contact details and/or Category 4 could be extended by making use of multiple images. All of these examples increase the complexity of each category respectively.

RSA Embodiment Scenario

The RSA cryptographic system is a prime example of a typical system that could be integrated with ICMetrics. In such an example, an ICMetric key may be employed as the private key "d'" of the asymmetric key pair. This key is then hashed twice with SHA-256 before being used. In current systems the private key must be physically stored on the device, if it is to decrypt data that has been encrypted with its public key. This leaves these systems vulnerable to backdoor attacks, as it is theoretically possible to gain access to and steal this private key. However if ICMetric technology is used to generate the private key, then the private key would not need to be stored, but could be regenerated when required from the feature values. When deploying the RSA algorithm in such a way, it is necessary to begin by randomly selecting two distinct and large prime numbers, which in this example can be described as p and q. These prime numbers are selected through the repeated use of the Rabin-Miller primality test for candidate values until appropriate p and q values are found. The modulus for both the private and public keys, named n, is then calculated using:

$$n=p*q$$

The number of totatives for n is then calculated and represented as $\varphi(n)$. In a typical RSA key generation process the private exponent d is then picked by selecting a totative of $\varphi(n)$, using these two rules:

Rule 1: $1<d<\varphi(n)$
Rule 2: $\gcd(d, \varphi(n))=1$

The problem of integrating an ICMetric key into the RSA system arises at this point as the ICMetric-generated value d' we wish to use as d is not necessarily co-prime with $\varphi(n)$ and therefore rule 2 may not hold true. This problem can be solved through the use of an offset function that takes the d' along with an offset and returns the private key d, as can be displayed in this third rule:

Rule 3: d=f(d', offset)

The offset must be selected such that all three rules hold true. The function in this example may use addition or the XOR bitwise operation in order to return an appropriate value ford, although many options are possible here. The public key exponent e can then be derived by employing the extended Euclidian algorithm. The values n and e are retained as the public key exponent as usual. Additionally, it is necessary to retain the function f and offset locally on the device. An advantage of the system is that d can be generated on demand using rule 3 and therefore the values d', d, p, q and $\varphi(n)$ can all be discarded as soon as e has been generated. However in this system, the e value will not be conveniently small and therefore the encryption process will not be optimally fast. On the other hand, it is not possible to employ the Chinese remainder theorem for easy decryption as the values p and q are discarded. A distinct trade-off in the system's efficiency is made to greatly increase its security.

Embodiment for Elliptic Curves and Digital Signature Algorithm

Another algorithm that shows great potential for integration with ICMetric technology is Elliptic Curve cryptography (ECC). This cryptographic system is sometimes used in the Digital Signature Algorithm (DSA) to produce the necessary asymmetric keys. Therefore if successfully integrated there is potential to distribute digital signatures that have been encrypted with an ICMetric-generated private key. The initiation of an Elliptic Curve Digital Signature Algorithm (ECDSA) is undertaken in two distinct stages: parameter generation and computation of user-specific keys. During the parameter generation stage, three specific parameters must be generated and agreed upon by the users of the system. These parameters can be said to be: (CURVE, G, n). The elliptic curve equation is denoted as CURVE and is generally defined by the operator of this system. The base point on the curve is denoted as G while the multiplicative order of point G is denoted as n. Once the parameters have been defined by the system operator, they can be shared between all users of the system for use during the signing and verification processes.

The user-specific key generation stage produces a private and public key pair on a system user's device. In the traditional approach to implementing ECDSA the private key $d_A$ is randomly selected with the constraint that it falls within multiplicative order of G, therefore it must be within the bounds [1, n−1]. However unlike the RSA implementation (mentioned above), $d_A$ can be produced with relative ease through the ICMetric key generation process. In this system the ICMetric key must only adhere to the single rule in that it falls within the multiplicative order of G. If this rule is met the ICMetric key can be used as $d_A$. If the ICMetric key does not adhere to this rule, the modulo-operation must be applied to $d_A$ using n as the modulus. The ICMetric-generated $d_A$ can then be applied to the following trapdoor function in order to generate its public key $Q_A$ counterpart:

$$Q_A = d_A \times G$$

where X is an elliptic curve point multiplication by a scalar.

The public key $Q_A$ can now be distributed between each other user of the system and stored alongside the other parameters. The distinct advantage of using ICMetric technology in the generation of $d_A$ is that it can now be discarded at this point in the process; there is no need to store it. At the time that a digital signature needs to be produced, $d_A$ can once again be immediately generated through the use of ICMetrics. The verification process can be undertaken as it traditionally is, as each device's $Q_A$ must still be stored in memory.

Side Channel Attacks Prevention Embodiment

Specific techniques in the way ICMetric keys are generated are currently being explored, potentially offering the prevention of side channel attacks. Take for example the differential fault analysis attack that would attempt to induce a fault in the program in order to produce and analyse differing results. Such an attack can be rendered counter-intuitive in breaking the security of ICMetric technology by including an analysis of the ICMetric key generation process as an ICMetric feature itself. In such a case the very act of inducing a fault in the ICMetric algorithm would, in turn, further change the resulting ICMetric key, consequently obfuscating the internal states of the algorithm from the monitoring process.

During a differential power analysis, faults are induced in the system by creating unexpected environmental conditions. The arising faults can then potentially begin to reveal the inner workings of the system as it outputs 'half-baked' results. By inducing these faults at various stages through the system an attacker can begin to build an increasingly fuller picture of how the system works. In order for a differential power analysis attack to take place the attacker must manipulate the environment of the system to force errors, in this case the power of the system. These same environmental factors can also be used in the ICMetric algorithm to contribute to the resulting key. By calculating these environmental factors first then using the bitset XOR operation to combine them with any subsequent features, the further inner workings of the algorithm will be obscured by the influenced environmental factors.

Figure 4:
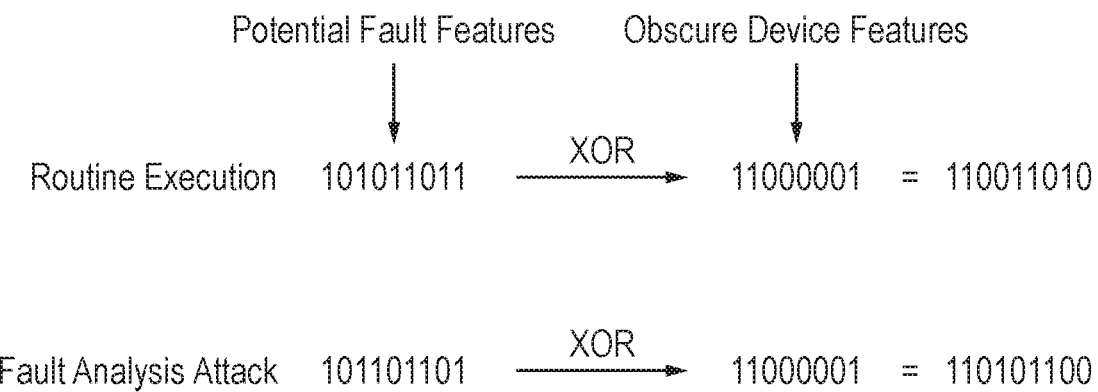
FIG. 4 illustrates two key generation processes.

FIG. 4 shows two key generation processes; a routine execution and a fault analysis attack. The bit values recorded from these environmental conditions are different during a routine execution compared to a fault analysis attack. However the obscure device features will remain the same and thus can usually be revealed during such an attack. By using the XOR operation on these obscure features as soon as they are gathered it can be appreciated that the differing environmental factors produced during an attack can be used to change the stable values that an attacker is attempting to collect. Any attempt to induce a fault in the system will in effect change any subsequent results that the system can produce therefore further obscuring the inner workings of that system.

Password Enhancement

Figure 5:
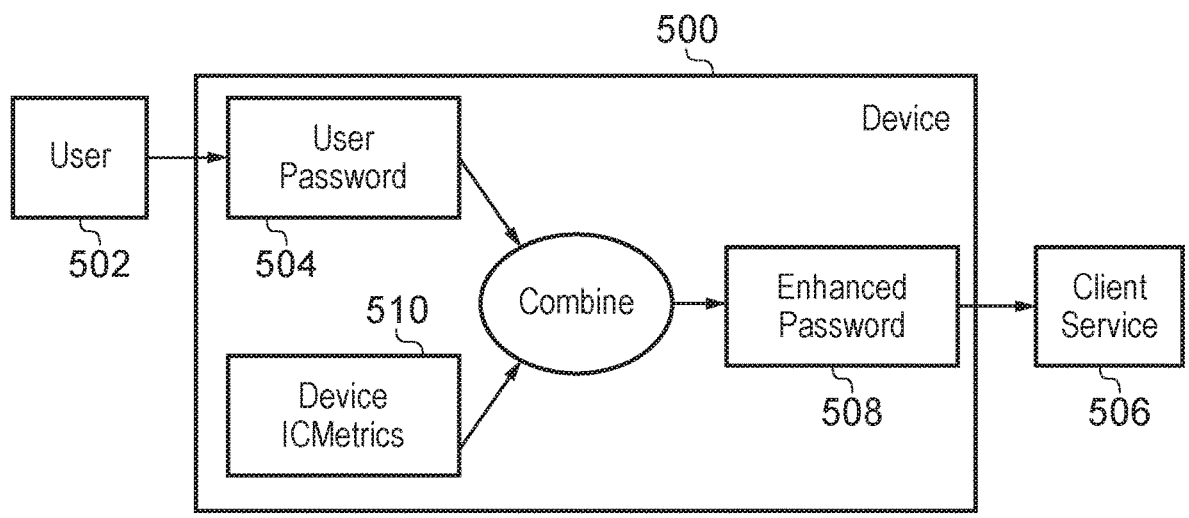
FIG. 5 illustrates forming an enhanced password at a device.

The present techniques suitably permit augmentation of the security offered by traditional security systems by incorporating a technology to derive security identifiers or even encryption keys from the operating characteristics of the device utilised. Thus password-based security systems can be enhanced by incorporating a technology to derive security identifiers or encryption keys, called ICMetrics, from the operating characteristics (or features) of the device on which the password is entered by combining both password and ICMetrics to form an enhanced password as shown in FIG. 5. While the user 502 supplies a password 504 to the device 500, this password is suitably not sent outside the device to the client service 506 that the device is communicating with. The enhanced password 508 is used instead. Therefore, the user password 504 is protected and constrained to the device 500 only.

The concept of the password-enhancing technology is to increase the strength of the security offered by a password-based authentication system. Traditionally, password-based systems suffer from low entropy (number of possible permutations) or are easy to guess (the user has to remember the password), or the password is written down. ICMetrics is a technology where a large and complex unique identifier that cannot be feasibly committed to memory can be generated on demand rather than storing and reading device-specific data when needed. A fundamental property of the ICMetric technology which allows it to operate is the metrics of characteristics of a system which, within the context of an ICMetric system, are termed features. The password enhancer approach is designed to employ this ICMetric technology to derive a strong password without requiring the user to remember the complex derived password or having to store the password on the device where it can be stolen.

The password enhancing technology adds a second, ICMetric-based, factor (510, identified as "Device ICMetrics" in FIG. 5) to a what-you-know password-based authentication system. By utilising feature values from a device 500 into the password derivation process, the feature values provide a what-you-have factor in the authentication system.

Suitably, the system combines the device ICMetric with the password 504 supplied by the user 502 to generate a single value (508, the "Enhanced Password" identified in FIG. 5), which is passed on to the client service 506 as the actual password. This is achieved without additional user interaction; the user can just supply the original password 504. The combination can, for example, be performed by using a one-time pad and/or secret sharing, as discussed in more detail below.

Generally, when a value for an ICMetric feature is read, it is mapped to an arbitrary value that helps to represent a specific device. It is much easier to map well-behaved, or well defined, features but when feature values exhibit unpredictable behaviour it can be difficult to accurately map their values correctly during the key derivation process. Features that are challenging to map commonly have a high intra-sample variance, and if features that have a high intra-sample variance are integrated into the ICMetric system then a mechanism is suitably needed to guarantee that the system will not fail for a valid user and device. One approach to handling unpredictable features is allowing the system to correctly authenticate a user even if a small minority of unpredictable features employed by the system fail. This will be described in more detail below.

Updating Passwords

Most web services that protect user access through a username and password offer the ability for the user to change their password as desired. This permits the user to employ the password enhancer application to increase the strength of their password used to access the system. In a mobile device-based embodiment, the application can run as an extension in a browser at the device. It is possible to integrate the password enhancer via the change password service by navigating to the web page where a user can supply a new password for the server to store a hashed copy for future authentication. After supplying the current password, the password enhancer extension can be launched directly in the browser, and can have an input field to collect a user password that the user will need to remember, and a call to action to convert this basis password into a strong (enhanced) password.

Figure 6:
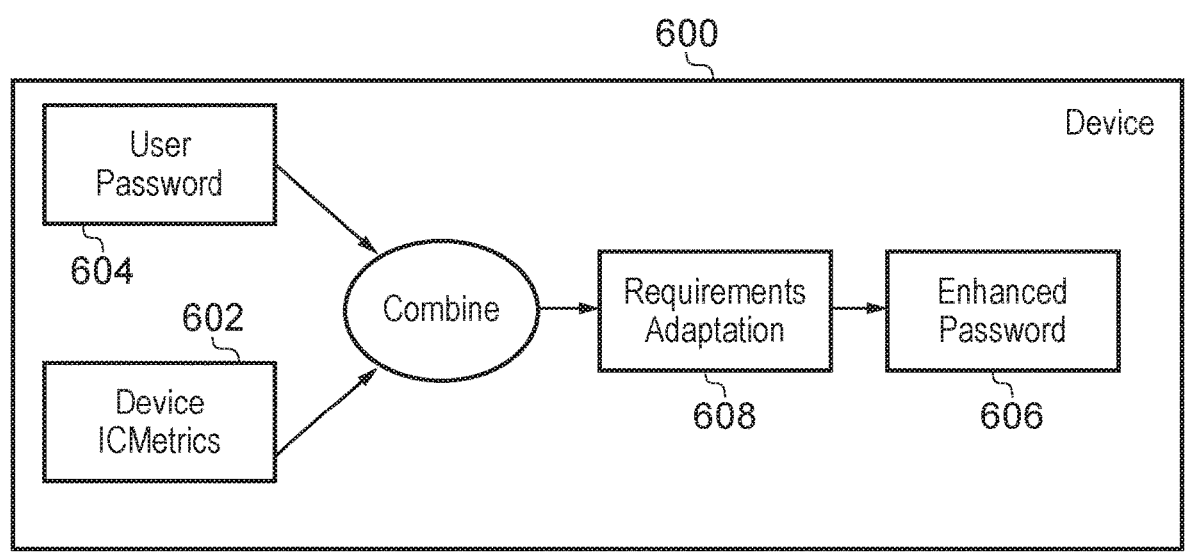
FIG. 6 illustrates modifying a password at a device to satisfy password requirements.

In one example, the system can deal with a case where specific requirements, such as requirements in a set of requirements are placed on the required password by the server, such as a number of uppercase characters, a number of lowercase characters, a number of numeric digits, a number of symbolic characters, the length of the password, and any characters not to include (see FIG. 6). The set of requirements may comprise more than one requirement. It operates by allowing the user to generate a new (enhanced) password 606 (which can be generated in dependence on a user password 604) stipulating if the enhanced password 606 should address the requirements such as those discussed above. A basis ICMetric value 602 can, for example, be created by using two images stored on the device 600 and selected as a symmetric encryption key for encrypting the hash of the second image selected. Characters are then derived from each pair of characters in the encrypted hashed value. Characters are suitably derived by taking the value modulo the valid range of ASCII character codes plus minimum valid ASCII character value to ensure the resulting password passed to the server represents a valid character. The character may then be filtered against the configuration and concatenated to the final password string. For example, if the ICMetric value would contain "Ab!@T", and neither the "!" or "@" are permitted, both the "!" and "@" would be mutated (for example at a Requirements Adaptation module 608) to valid characters. The extension can populate the new password field in the web form with this new password. Finally, the app can encrypt a string with the new hashed password which can be used to verify features offline when performing operations like changing a user's password.

Once a valid password has been created and sent to the server, the polynomial degree and total number of shares (i.e. the number of secret shares) to create is supplied to the application prior to the polynomial being generated. Once these values have been calculated, the users passwords and feature values are hashed and XOR'd with their associated point on the polynomial and the result of this logical operation is stored. The user password, feature values, and any recovery phrase (which would form an additional polynomial point to circumvent the ICMetric should this be deemed a necessary requirement), can be changed on the device by simply XOR'ing the appropriate saved value with the existing value then XOR'ing the result with the new value. Significantly, this does not require any intervention by the server at any point in this process.

Optionally, solving a polynomial to derive a password not only allows the system an acceptable level of robustness but it also allows the addition and removal of features, and other data that can be used as a substitute to features on a device, like the above-identified recovery phrase. This can offer the guarantee that the system is always accessible even in the result of the ICMetric features failing due to errors in the configuration, but the trade-off is a loss of additional security. This approach also boasts the advantage of being independent of the server.

Once the polynomial has been created and the auxiliary points have been saved, it can now be used on demand. Again, from directly within the default browser on the device and independently of any external server, a user can launch an extension on the login page of a website, where they can enter their easily memorable credentials into the extension's view before requesting the extension to invoke the app to XOR the submitted hashed values, and read feature hashed values with the saved values and calculate the Y-intercept. The extension can then populate the password field on the web page with the result of the calculation before it is sent to the server for authentication. Not only can the calculated password be complex compared to a commonly used user password, but the account is not compromised if the user has their password stolen as it is just one point of the polynomial used for password generation, and an attacker would need their device as well to be able to regenerate the polynomial and determine the enhanced password.

Figure 7A:
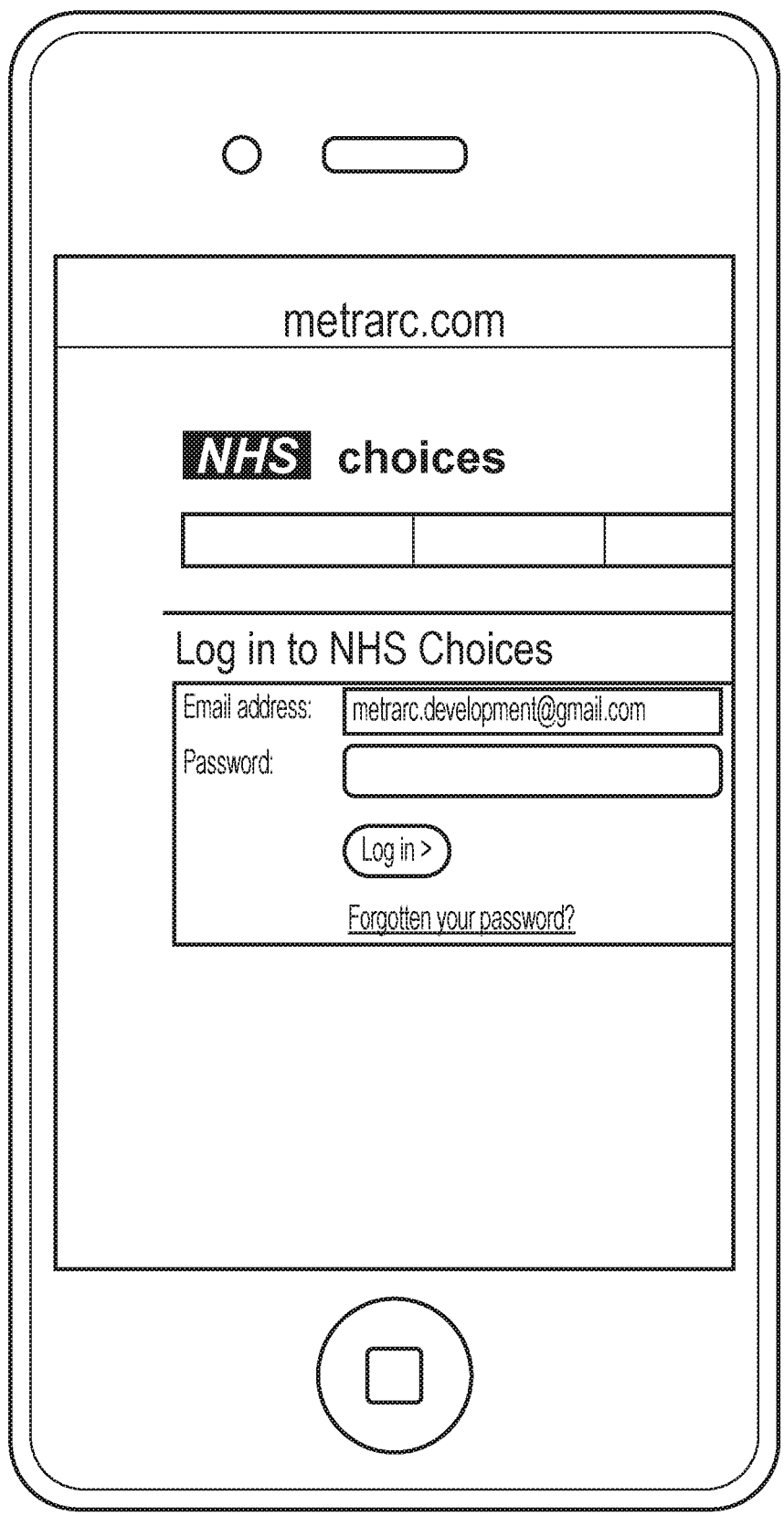
FIG. 7A illustrates an example of a browser on a mobile device.
Figure 7B:
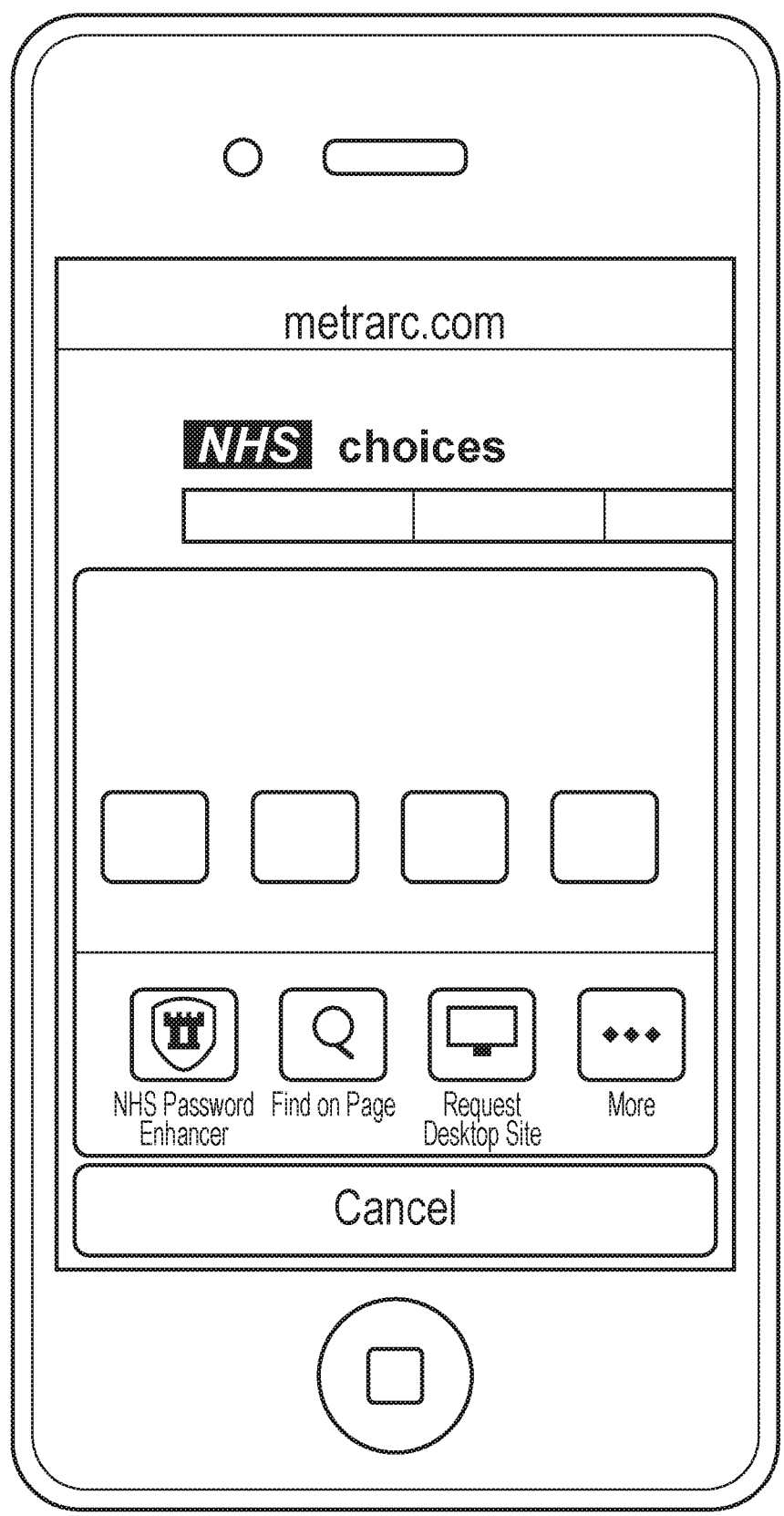
FIGS. 7B and 7C illustrate accessing a password enhancer app extension at mobile devices.
Figure 7C:
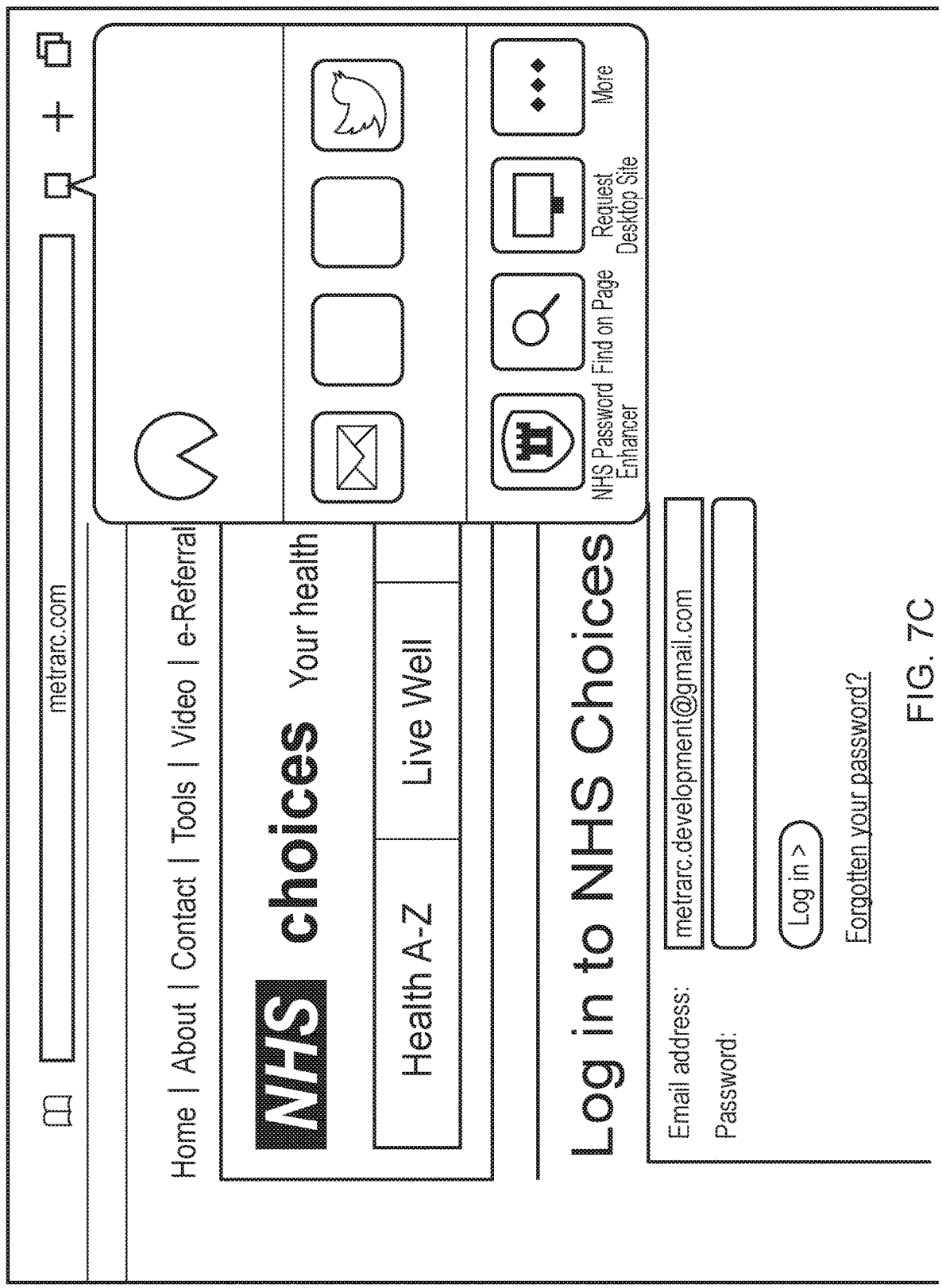
Figure 7D:
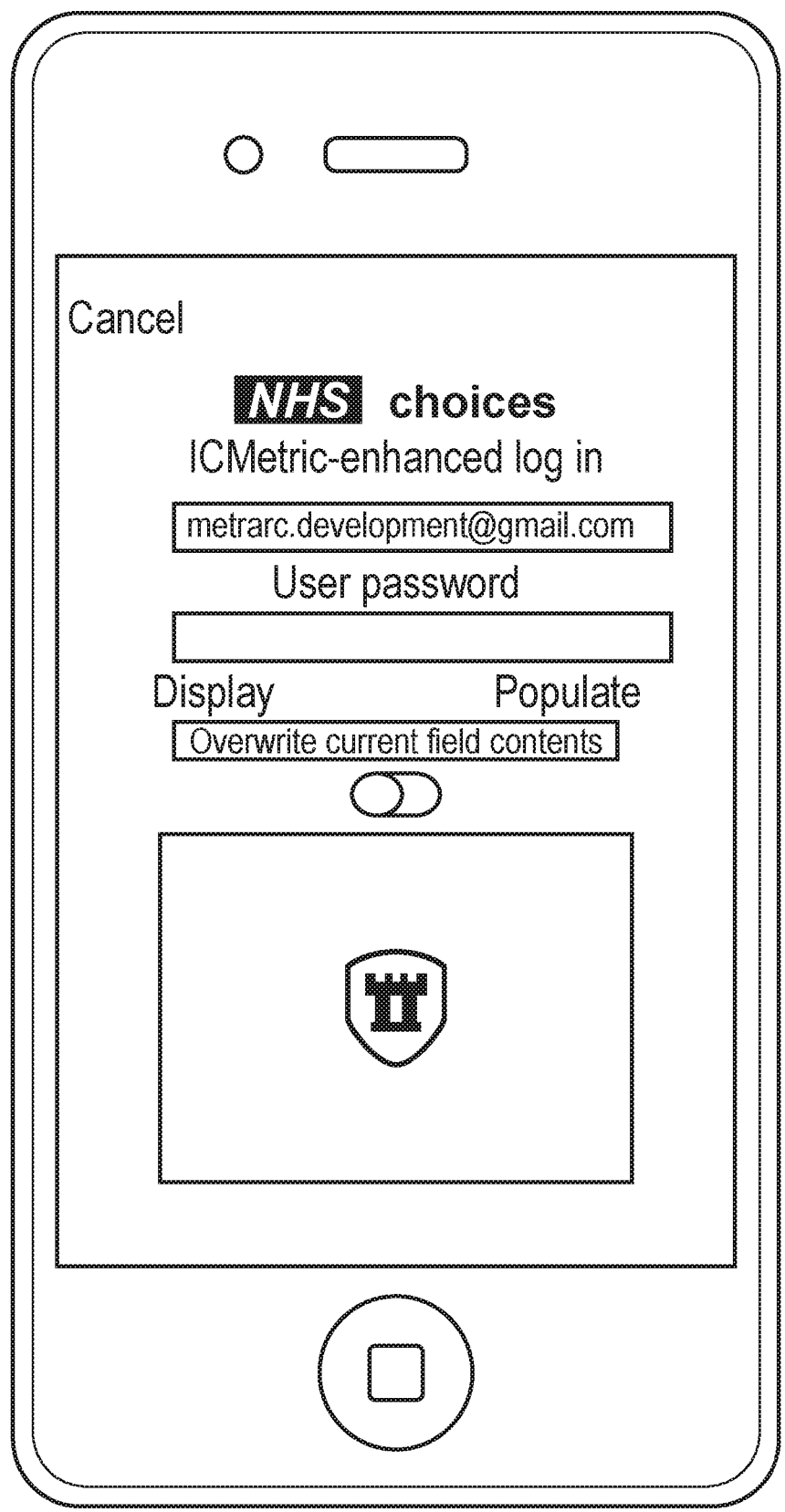
FIGS. 7D and 7E illustrate a password enhancer app extension at mobile devices.
Figure 7E:
Figure 7F:
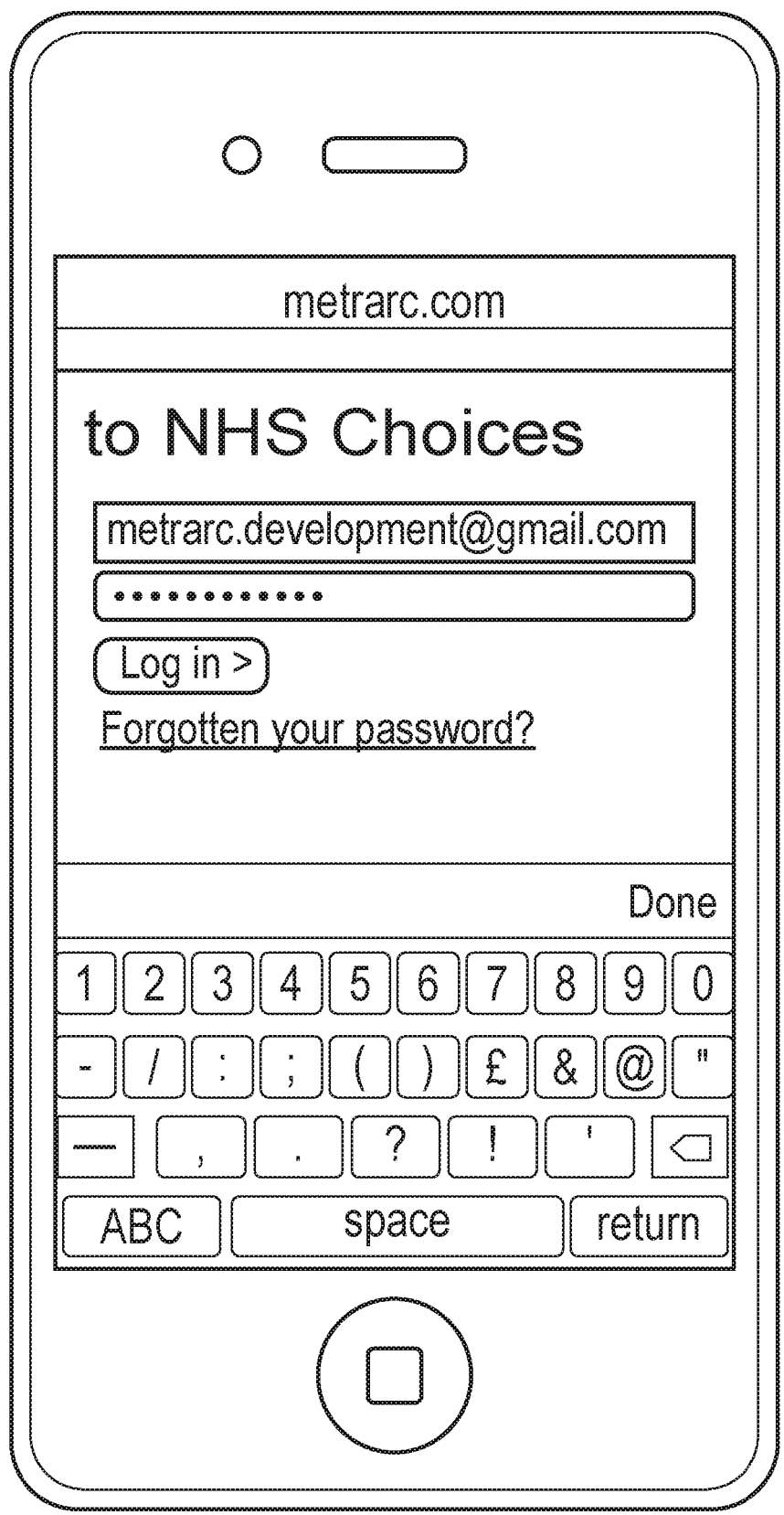

As discussed above, the application is designed to provide additional security, directly in the default browser of a device such as a mobile device, for password-based authentication protocols. An example is illustrated in FIG. 7. In this example, browsers are shown on a mobile telephone (an iPhone, FIG. 7A) and a tablet computer (an iPad), both running iOS. The browser used in the illustrated example is the Safari web browser. Entering the user's password without using it in conjunction with the device's features will result in authorisation failing for the user. The app extension can be launched from the share button in the browser (FIGS. 7B and 7C). Clicking on the appropriate icon launches the extension over the current web page (FIGS. 7D and 7E). The user's password is entered in this User Interface and the ICMetric process is initialised after the populate button is pressed. During the ICMetric process, the extension calls functions in the associated application to read feature values and calculate the Y-Intercept, the result of which is the password to send to the server. After the final password is calculated it is populated into the web field (FIGS. 7F and 7G) so it can be sent to the server, for example over SSL/TLS, for hashing and verification.

Correlated Features

Correlated features are desirable, as they provide a greater level of obfuscation than singular features. This is because they are derived from singular features. A part of the obfuscation of the ICMetric key generation process is related to hiding the list of the features that are used in the process. Singular features are features that are measured directly from the device rather than being derived. Correlating features adds an extra step when trying to recreate the values, as the correlated values have to be generated and cannot be read directly from a device. Importantly, each correlated feature can itself be used as a feature, which has the benefit of increasing the entropy of the key, generated by the ICMetric algorithm. Additionally, a correlated feature that is chosen can be the subset of features that are more stable than the singular feature, as they represent a relationship between features rather than coming from a specific range, meaning that there is less intra-sample variance, thus increasing reproducibility of the generated key. While a basic analysis can focus on correlations between two features, this can be extended to look at any number of features together.

Table 6 shows example embedded hardware features used to produce a correlation analysis, such as a correlation matrix, of all the feature pair combinations. Each point in the matrix represents the correlation between the feature relating to the row and the feature relating to the column where the identity of the feature may be read from Table 6. The colour (or shading in a greyscale representation) of the square at that point is how strongly the features are correlated on a scale from yellow (lighter) to red (darker) where yellow represents a strong positive correlation, red represents a strong negative correlation and orange (in between lighter and darker extremes) represents no correlation.

TABLE 6

| Features used in Correlation Matrices | | | |
|---|---|---|---|
| 1. MemFree | 2. Buffers | 3. Cached | 4. Active Memory |
| 5. Inactive Memory | 6. Active_anon | 7. Inactive_anon | 8. Active_file |
| 9. Inactive_file | 10. Unevictable | 11. HighFree | 12. LowFree |
| 13. Dirty | 14. Writeback | 15. AnonPages | 16. Mapped |
| 17. Shmem | 18. Slab | 19. SReclaimable | 20. SUnreclaimable |
| 21. KernelStack | 22. PageTables | 23. Committed_AS | 24. VmallocUsed |
| 25. VmallocChunk | 26. Exec_time | 27. Avail_memory | |

The entries in Table 6 are suitably defined as below. It will be understood that these are only example definitions, and that variations to these definitions will be readily apparent. Taking the first definition, of MemFree, as an example, whilst the definition provides that it is the amount of unused RAM in kilobytes, it might instead be some other division of memory, such as megabytes.

| | |
|---|---|
| MemFree | The amount of physical RAM, in kilobytes, left unused by the system. |
| Buffers | The amount of physical RAM, in kilobytes, used for file buffers (storage for raw disk blocks). |
| Cached | Memory in page (disk) cache, minus swap cache. |
| Active Memory | The total amount of buffer or page cache memory, in kilobytes, that is in active use (not reclaimed/swapped out). |
| Inactive Memory | The total amount of buffer or page cache memory, in kilobytes, that is free and available. |

-continued

| | |
|---|---|
| Active_anon | Anonymous memory that has been used more recently and usually not swapped out. |
| Inactive_anon | Anonymous memory that has not been used recently and can be swapped out. |
| Active_file | Pagecache memory that has been used more recently and usually not reclaimed until needed. |
| Inactive_file | Pagecache memory that can be reclaimed without huge performance impact. |
| Unevictable | Unevictable pages that cannot be swapped out. This may be for a variety of reasons. |
| HighFree | The total and free amount of memory, in kilobytes, that is not directly mapped into kernel space. |
| LowFree | The total and free amount of memory, in kilobytes, that is directly mapped into kernel space. |
| Dirty | Total amount of memory, in kilobytes, waiting to be written back to disk. |
| Writeback | Memory, in kilobytes, which is actively being written back to disk. |
| AnonPages | Non-file backed pages mapped into user space page tables. |
| Mapped | The total amount of memory, in kilobytes, which has been used to map devices, files, or libraries using the mmap command. |
| Shmem | Total used shared memory (shared between several processes, thus including RAM disks, SYS-V-IPC and BSD like SHMEM). |
| Slab | Total amount of memory used by the kernel to cache data structures for its own use. |
| SReclaimable | The part of the Slab that might be reclaimed (such as caches). |
| SUnreclaimable | The part of the Slab that cannot be reclaimed under memory pressure. |
| KernalStack | The memory the kernel stack uses. This is not reclaimable. |
| PageTables | The total amount of memory, in kilobytes, dedicated to the lowest page table level. |
| Committed_AS | The total amount of memory, in kilobytes, estimated to complete the workload. This value represents the worst-case scenario value, and also includes swap memory. |
| VmallocUsed | The total amount of memory, in kilobytes, of used virtual address space. |
| VmallocChunk | The largest contiguous memory block of available virtual address space. |
| Exec_time | System performance measured as execution time. |
| Avail_memory | Available memory. |

Figure 8:
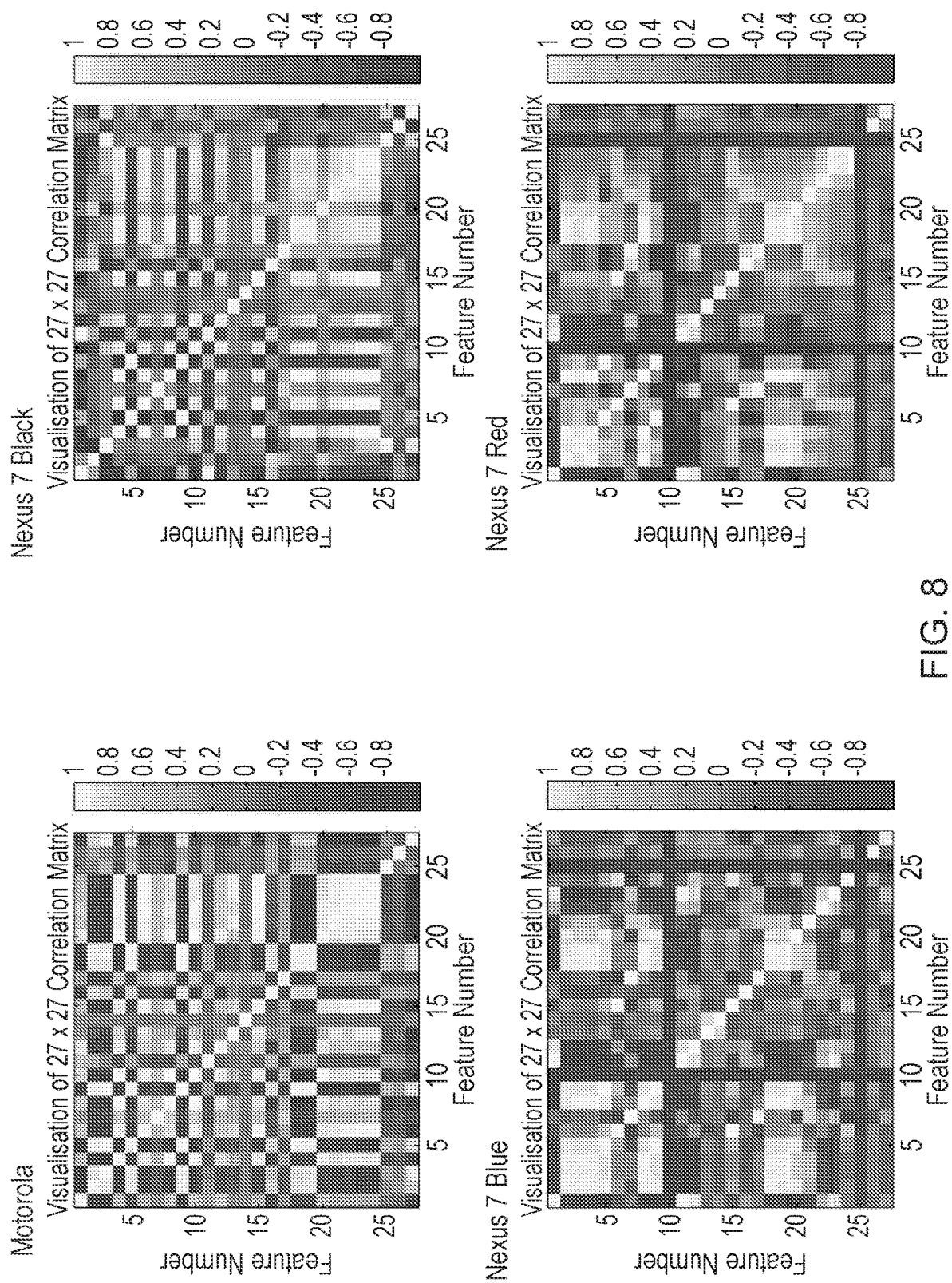
FIG. 8 illustrates correlation patterns for different mobile devices.
Figure 8:
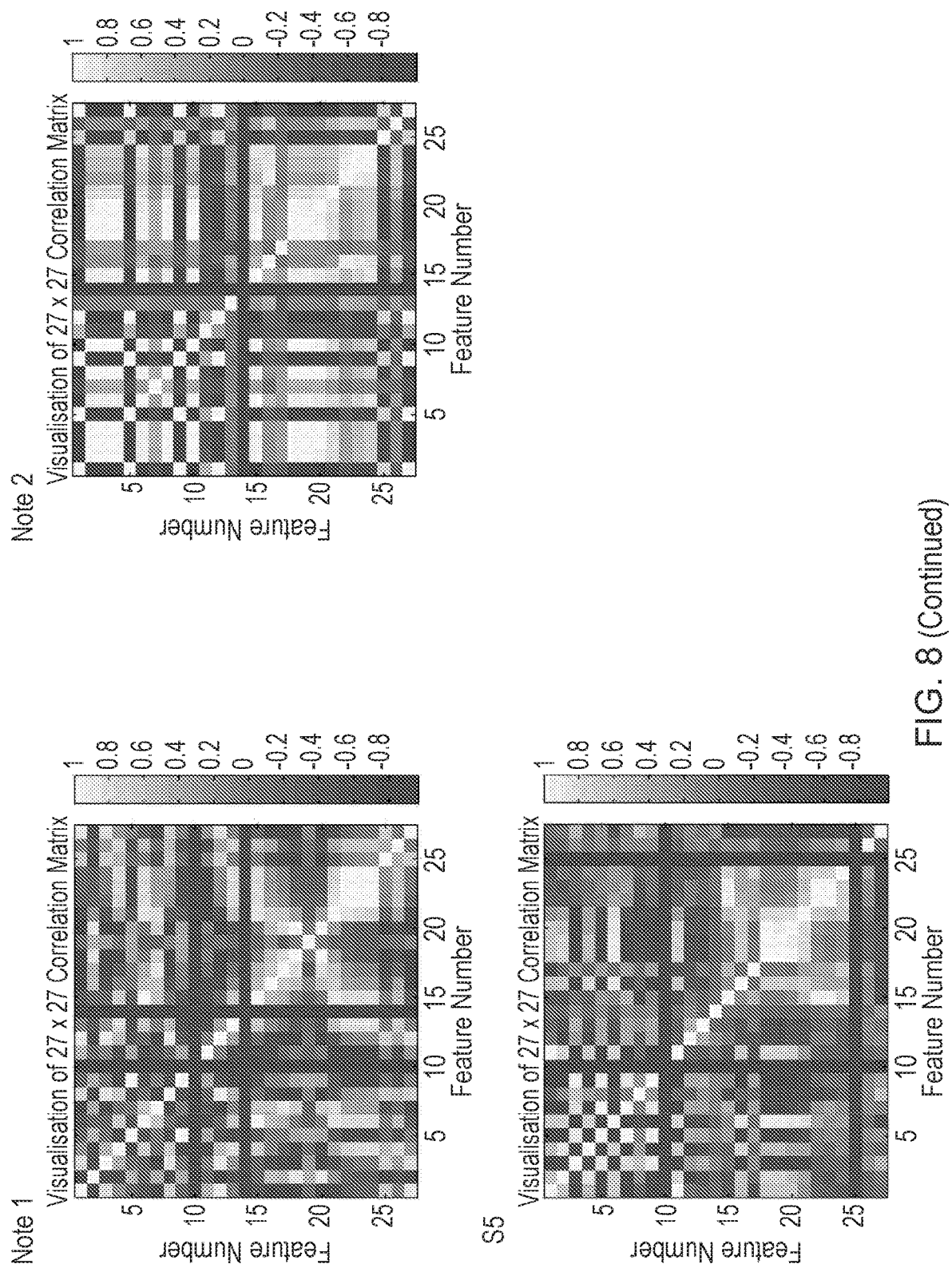

The aim of these visualisation matrices is to find reliable correlations that are exhibited for all the devices. With reference to FIG. 8, it can be seen that the following pairs of features showed a strong positive correlation with a Pearson correlation coefficient over 0.8, thus indicating that they have a sufficient correlation to be considered. Active Memory (4) and Active File (8) are directly correlated with each other and have an average correlation coefficient 0.85; similarly Inactive Memory (5) and Inactive File (9) are strongly correlated with a coefficient of 0.99. The Active Anonymous (6) and Anonymous Pages (15) also show a strong positive correlation, all of these correlations are based on the fact that the former feature encompasses the latter feature completely such that the first feature is a combination of the second feature plus one or more additional feature. Additionally, correlations such as between Slab (18), the total amount of memory used by the kernel for its cache data structures, and SReclaimable (19), which is shows definitive correlations as the SReclaimable is part of the slab memory. The features PageTables (22) and Committed_AS (23) also show a strong positive correlation without any straightforward explanation for a correlation. This makes for a highly-obfuscated feature and the correlation would not be easily determinable without knowledge of the feature making it an extremely useful feature.

Embodiment for Secure Key Storage and Retrieval
Private Key Protection

Figure 9:
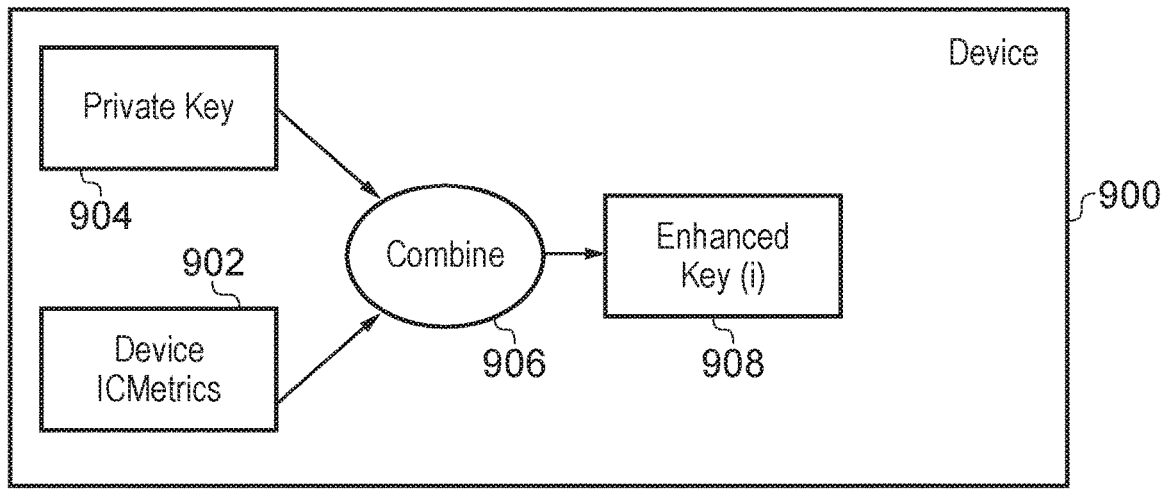
FIG. 9 illustrates forming an enhanced key from a private key at a device.
Figure 10:
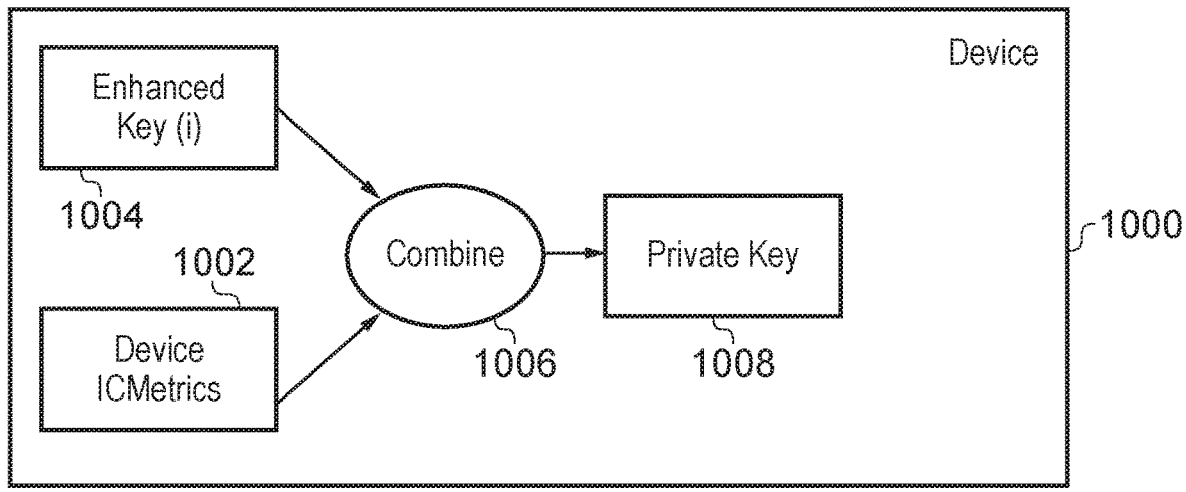
FIG. 10 illustrates retrieving a private key from the enhanced key of FIG. 9.

The protection of existing private keys represents a significant use case for the technology discussed herein. This may be achieved by several mechanisms representing increasing level of protection in each case. In the first case, illustrated in FIG. 9, the derived ICMetric 902 is combined with a private key 904, using a suitable combination function 906 such as a one-time pad (XOR function) to generate an Enhanced key 908, which in some examples can also be combined with symmetric blockcyper algorithm such as AES. The secure properties of the one-time pad ensure that the only way to retrieve the key is via the regeneration of the Device ICMetric 1002 as illustrated in FIG. 10. Alternative combination strategies to the one-time pad may be employed such as the use of the Secret Sharing approach, where the required Private Key would represent the intercept on the vertical axis of the generated polynomial and the Device ICMetric would constitute the points on the polynomial as described herein. In this embodiment, robustness becomes an intrinsic component of the key protection strategy as the order of the polynomial employed may be utilised to allow some components of the generated Device ICMetric to fail. The fundamental advantage of this scheme is that secure storage of the required Private Key is achieved whilst nevertheless ensuring that the information recorded is insufficient to recover the key. Under the inherent properties of either the one-time pad or secret sharing approach, this is guaranteed. The secret sharing approach naturally allows for straightforward revocation of the private key, if this is required by employing a different polynomial.

The above system guarantees that ICMetric regeneration is required to release the Private Key. In order to protect against side channel attacks during the ICMetric generation process, a cipher block chaining approach can be utilised in some examples, such that at each key access iteration, a new enhanced key is generated from the previous enhanced key, thereby ensuring the stored value is unique at each iteration. An initialisation vector (IV) is naturally required here, which may be a component of the ICMetric if sufficient entropy is available, but this need not be the case. Here, the combination suitably includes an additional encryption step, e.g. AES using the ICMetric as the "key", to prevent $k(i+2)$ from being the same as $k(i)$. Key access may be achieved in the standard fashion of cipher block chaining, using the ICMetric key for the AES step $k(i-1)$ as the one-time pad step, where $k(0)$ is the initialisation vector (IV). An even more advanced level of security can be achieved by utilising a different device ICMetric at each iteration which may be achieved by varying the polynomial of the Secret Sharing used to generate the key or the number of normalisation maps utilised within the component mini-ICMetrics.

Feature Sets and Fault Tolerance

The features of a device can be logically categorized into specific sets. The device features contained within these sets share similar traits or are affected by the same modifications and reorientations of a device. A practical implementation of ICMetric technology could potentially use hundreds of these feature sets. With such a large potential for scaling it cannot be assured that every feature within every set will produce the same result every time ICMetrics is used on a device. Fault tolerance must be created for these sets in order to create a system that not only produces a key that is highly unique but one that is also wholly reliable. This can be achieved for ICMetric technology through the use of a secret sharing cryptographic algorithm, the details of which are discussed below. When using this algorithm a key is generated and split between a number of participants, in this case one part for every set that is contributing features to ICMetrics. The amount of these key shares required to reconstruct the key can be defined when using this algorithm. Either the defined amount of shares or more will be required in order to produce the same key again. Using this algorithm we can define in the system how many of these feature sets are allowed to fail while still maintaining assurance of the system's security. In a case where hundreds of categories contribute to the key, if a few set values change due to device modification or reorientation then the other sets will still be able to reconstruct the key with their shares. However, once enough sets fail, the system falls below the secret sharing reconstruction threshold previously defined (see the discussion of the tolerance above), a different key will be produced and suitably measures to protect the data would then be taken.

Furthermore, this algorithm can be applied in the same way within specific sets, allowing a single set to contribute to the key even if it contains a volatile feature that could sometimes potentially fail. Specific weighting can also be applied to certain features and sets, defining how important it is for them to contribute to the key. Some features are much less volatile than others and thus changes in their values should be dealt with uncompromisingly. For example, the IP address may be allocated a higher weighting indicating its increased reliability for deriving the identity of the system whereas specific benchmark data may be less reliable. This may also be applied to feature sets rather than individual features. For example, in the feature sets introduced below, feature category 3 (based on a contact list) could be allocated a lower weighting than feature category 2 (based on network connection and availability) indicating its lower reliability.

The feature sets produce specific length words (termed mini-ICMetrics) and after they have been generated and normalised during the calibration phase the secret sharing will be determined. The tolerance of the system is set in order to declare how many of the mini-ICMetrics are required to rebuild the secret. In this case, the mini-ICMetrics are the sets and the secret is the un-hashed ICMetric key. The secret sharing is set up in a manner that allows for multiple levels of security. The different levels of security provide distinct levels of access to the system, which we call the "tolerance" of the system. The tolerance can be modified to allow partial access into the system only if the tolerance is set low enough to allow for multiple incorrect shares. Suitably a polynomial is generated for each access level of security required in the system. The degree of the polynomial is equal to the number of mini-ICMetrics required to gain access minus one. For example, if three shares were required then a quadratic polynomial would be generated.

Figure 11:
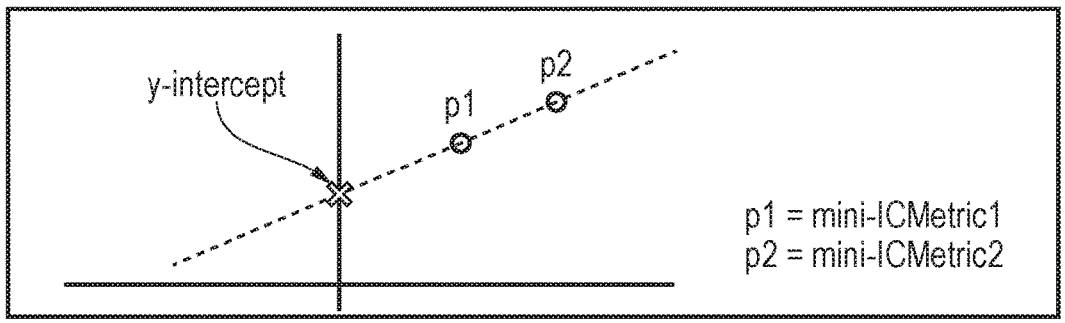
FIG. 11 illustrates an example polynomial showing the y-intercept.
Figure 12:
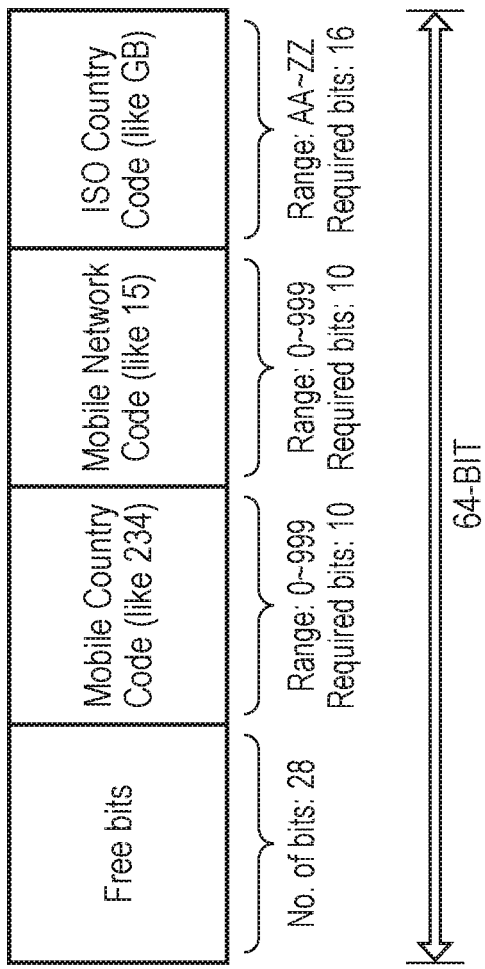
FIG. 12 illustrates an example category of features.

FIG. 11 shows an example of how the intercept may be generated for a $1^{st}$ degree polynomial (i.e. a polynomial of order one).

Each polynomial is evaluated using the category values as an argument to generate a set of values. The resultant set of values comprise the Y values from the co-ordinate pairs where the X values are the category values. Each set of Y values is suitably stored with the degree of the polynomial that was used to generate them. The polynomials and the category values may be discarded. Thus only the Y values may be left on the system, which alone cannot be used to recreate the polynomial that generated them. To recreate the key, the features are measured from the device and the mini-ICMetrics regenerated. Each polynomial has a set of Y values that are associated with it, saved on the system. To recreate each polynomial a subset of the Y values is used. The size of the subset is equal to the minimum number of mini-ICMetrics required for that polynomial. The Y values are recombined with their corresponding category values to create co-ordinates. The co-ordinates are interpolated to generate a polynomial. The generated polynomial's Y intercept is saved as one of the possible ICMetric keys. This process is repeated for all the subsets of co-ordinate pairs to obtain a set of ICMetric keys. The set of keys is verified to verify if a correct key was generated using a subset of the correct categories. The key is verified by attempting to decrypt a message that was previously encrypted with the ICMetric key. For example when three mini-ICMetrics are required to be correct in order to gain access the system, all the possible combinations of the three categories from the possible five (in one example) will be used to generate an ICMetric key and only the combinations that include three correct categories will produce the correct key. The combinations that include an incorrect category value will generate an alternate polynomial when interpolated thus producing an incorrect key.

The system will attempt to verify all the categories first to ascertain if full access may be provided. If this fails the system can retry by selecting four out of the five categories to generate an alternative key, if this succeeds a lower level of access can be provided. However, if it fails again, then the system can continue attempting to generate a key with fewer categories until the minimum tolerance is reached.

The advantage of this process is that the ICMetric key is not stored on the system and the only values that are stored are one half of the co-ordinates that are necessary to generate the polynomial that produces the key. The one half of the co-ordinates that are stored on the system cannot be used to find out the polynomial that was used to generate them. Additionally, a new ICMetric key can be generated any time the system needs to be changed or reset.

A pseudo code example of the Secret Sharing Algorithm is given below.

```
Set Tolerance;
Function generatePolynomials
{
    Create Categories;
        While (NumberOfCategories >= Tolerance)
        {
        P = polynomial of degree equal to Tolerance − 1;
            For Each Category
                {
                    YValue = evaluation of P(Category.value);
                    SETofYValues.add(YValue);
                }
        }
        Delete P;
        Store SETofYValues with Tolerance;
```

```
            Tolerance++;
        }
        Delete Categories;
}
Function recreatePolynomials
{
    Create Categories;
    CurrentTolerance = Categories.Count;
    While (CurrentTolerance >= Tolerance)
    {
            SETofYValues = GETSET with tolerance = CurrentTolerance;
            Points = Combine CategoryValues with SETofYValues ;
            For Each Subset(Points, size = CurrentTolerance)
            {
                    key = Interpolate(Point);
                    Keys.add(key);
            }
            if (Verify(Keys))
                    return ACCESSGRANTED with Level=CurrentTolerance;
            else CurrentTolerance--, Delete Keys;
    }
    return ACCESSDENIED;
}
```

The system is also designed to protect against the execution of code that is not original code the system designer intends to execute. This is to ensure that the software running continuously on a device, such as an embedded IoT device, has essentially the same behaviour as the original program for the purposes of security, and to detect any possible changes on the trusted software. The basis of our proposed system of ICMetrics is akin to dynamic systems analysis, which analyses the execution of a program on an embedded architecture. Thus, the system presented is mainly for flagging rather than directly stopping execution of malicious code. A common theme among many security attacks is hijacking the trusted code at run-time, so even if the original code is not malicious by intent, it can be manipulated by an attacker The most common method would be the exploitation of a buffer overflow to overwrite a return address, altering program control flow to a malicious code. We assume that the unexpected software running on the embedded device will result in a significant behavioural difference compared to the original program. The proposed system monitors the executing program continuously while constructing its behaviour to detect any changes. It is observed that any behavioural difference in the program execution trace can be detrimental and must be identified in real-time by monitoring the system behaviour. The proposed intrusion detection method will not prevent buffer overflow, but it could detect the abnormal behaviour caused by buffer overflow by monitoring system behaviour.

Grouping Features

To facilitate robustness in the system, features may be grouped together into related feature sets and a threshold for the number of valid feature groups needed to generate a password correctly may be set. In this implementation, the strong password is suitably the Y-intercept, the feature groups are suitably points on the polynomial, and the threshold is suitably the degree of the polynomial plus one. For example, two features that could change value between two locations could be the IP address of the device and the SSID of the network to which the device is connected. These features could both be grouped into a network group, and if a quadratic polynomial, with a degree of 2, was generated and there were five feature groups each representing a point on the polynomial, then only three of the five feature groups need to be valid for the polynomial to be solved and the password (Y-intercept) found. This means a valid user with a valid device does not necessarily have to fail authentication just because they attempted to generate a password from a different location.

The hashed values of the users password and the device's features can both make up points on a polynomial, and this implementation of the two factors allows the derived password to be sent to the client service (representing any server and/or service to which communication or password/credential-based access is required) for authentication without it ever knowing that both a users password and the users device are required before a correct password can be generated. Importantly, this two-factor authentication is completely transparent to the client service which means it can be integrated into existing systems that already use password-based authentication very quickly and easily without requiring any modification to the server side, as the server is simply not involved.

Example Sets

Figure 13:
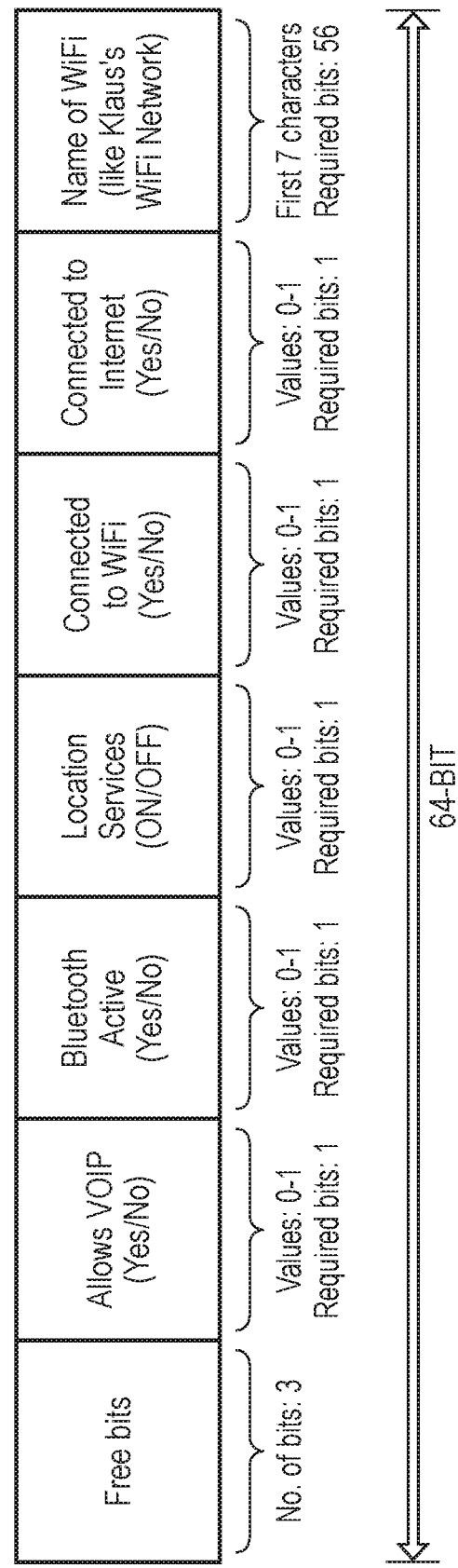
FIG. 13 illustrates another example category of features.
Figure 14:
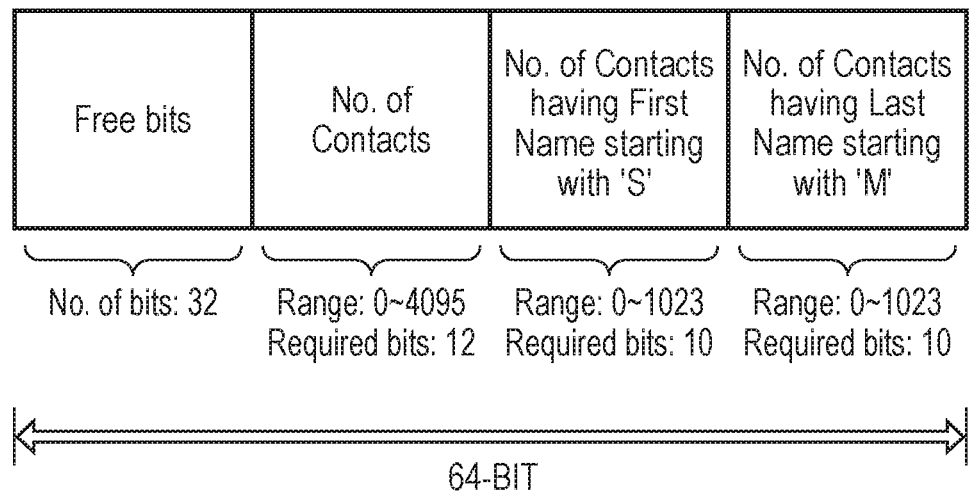
FIG. 14 illustrates another example category of features.
Figure 15:
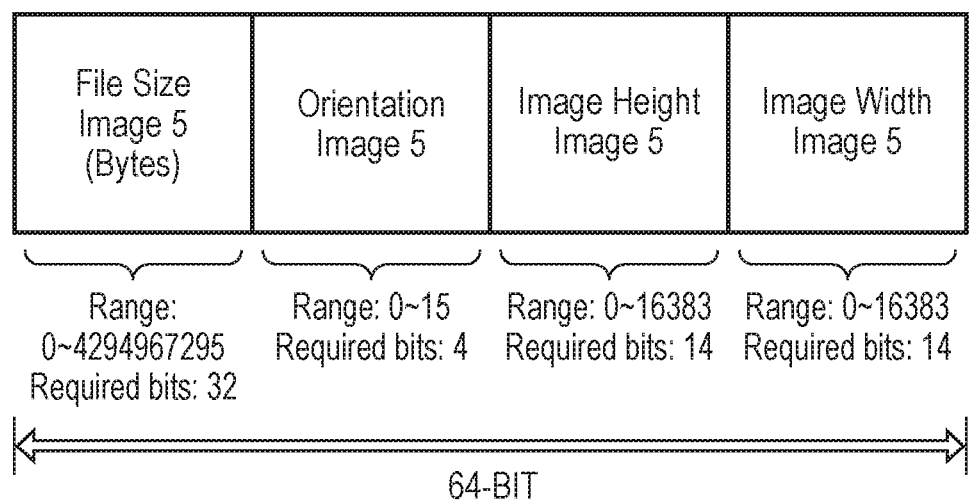
FIG. 15 illustrates another example category of features.
Figure 16:
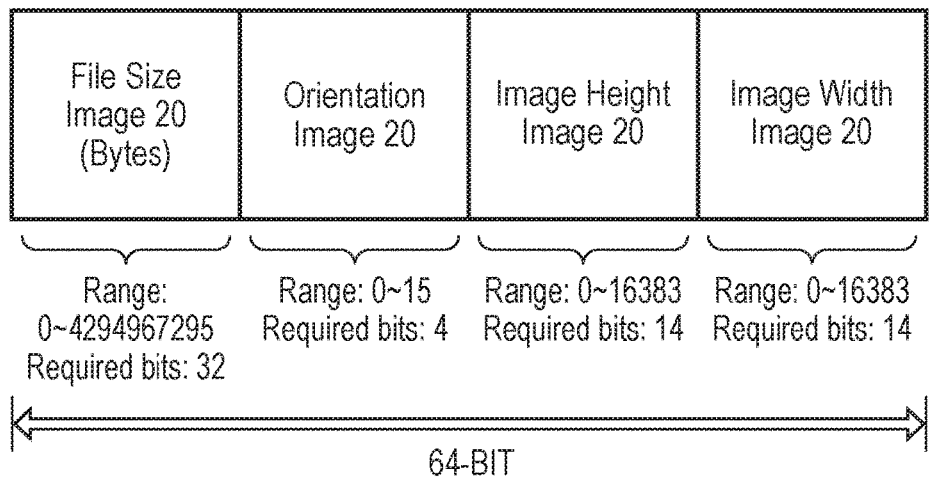
FIG. 16 illustrates another example category of features.

In one example, features falling in a specific class and/or category are suitably combined. For example, the feature category 1 (illustrated in FIG. 12) may comprise network-related features (mobile country code, mobile network code and ISO country code, for example). Feature category 2 may be formed by combining features such as Bluetooth services ON/OFF, WI-FI ON/OFF, and name of Wi-Fi for example (as illustrated in FIG. 13). Information from the user's contact list may be utilized to generate feature category 3 (as illustrated in FIG. 14). Feature category 4A and 4B may be formed based on information related to some specific images stored on a test device (as illustrated in FIG. 15 and FIG. 16). The number of bits required for each feature included in these feature categories, along with the word length of each feature category, is suitably selected, for example according to system requirements/capabilities. As illustrated in FIGS. 12 to 16, in this example the word length was fixed at 64 bits (8 bytes) for an individual feature category.

Feature Evolution Embodiment

An embodiment to increase the robustness of the system suitably allows failed sets to "evolve" into new values when the overall number of successful sets is sufficient to allow the polynomial to be solved. Within this embodiment, the mapping for the failed sets is adjusted so as to make the failed values lie within the range of valid values. In this way, on subsequent invocations of the system, the set will encompass the new values, potentially allowing a different feature set to fail. A simple illustration would be where the number of contacts on a phone increases dramatically causing a feature set to fail. If other sets are still capable of generating a valid set and hence the polynomial is still solvable, then the mapping employed is adjusted so as to allow the new number of contacts to again produce a valid point on the polynomial. This can be done by adjusting the point coordinate generated by the new values.

Entropy Smoothing

Figure 17:
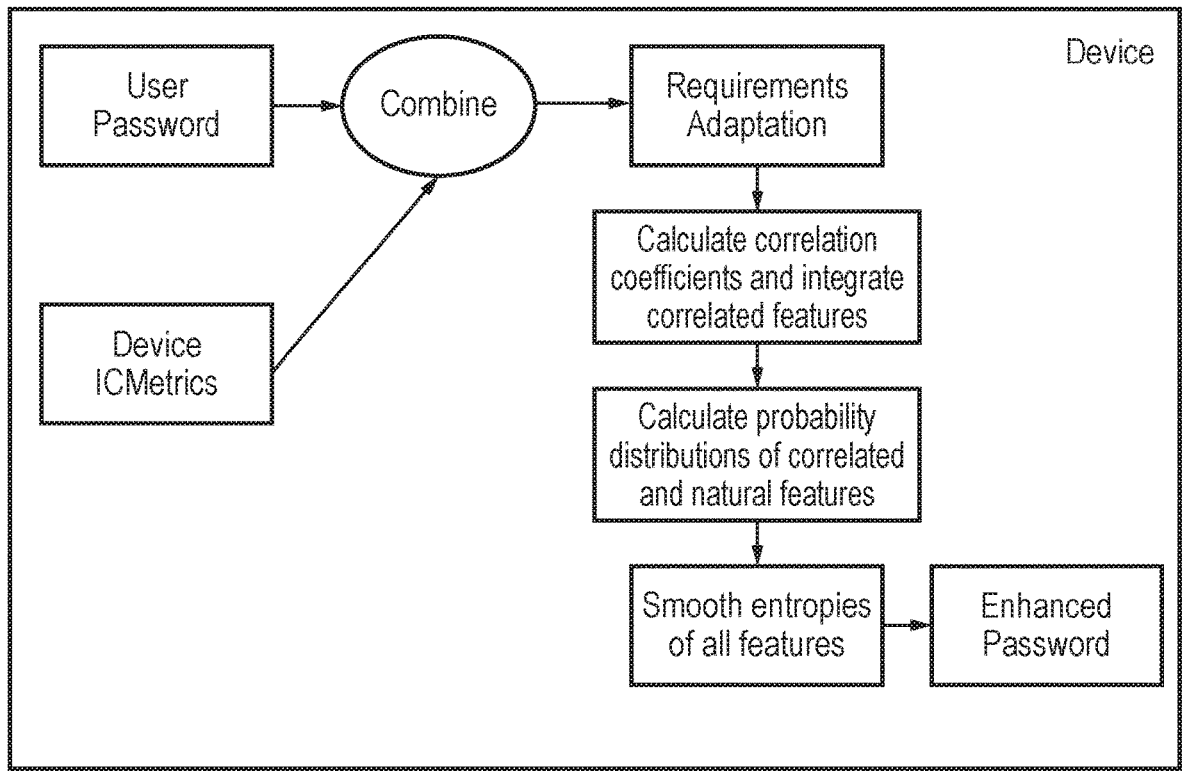
FIG. 17 illustrates entropy smoothing as part of forming an enhanced password at a device.

Entropy smoothing (illustrated in FIG. 17) represents an advantageous embodiment in which additional protection from attacks can be provided. It ensures that each of the generated keys is approximately equally likely to occur and thus neutralises the types of attacks which would focus on the most likely keys. An accurate entropy smoothing algorithm is essential to ensure the security of the system. It depends fundamentally on the probability distributions of the features employed by the ICMetric system. Any error in the probability distributions will naturally give rise to probability "spikes" in the keyspace, where some keys are more likely to occur than others. It is thus desirable to minimise such spikes, as they naturally represent a means of attacking the system.

Spoofing and device cloning both concern an attack on the system that attempts to impersonate a trusted device by modifying an alternate device to produce the same ICMetric as the trusted device. This is related to entropy smoothing, as poor entropy smoothing will allow the probability distributions of features to provide information as to potentially successful cloning scenarios.

Entropy smoothing is a process of combining candidate key values of relatively low probability such that the resultant combined key is equally likely to occur as those candidate key values that originally exhibited a high probability. The fundamental process is thus in determining the probabilities and combining them efficiently within the resulting space. To achieve this latter aim, the novel approach of calculating the probability distribution of the correlated features in two ways is taken.
1. Firstly, the value of the correlation coefficient itself is employed as a feature, as identified above, thus replacing the feature values within the feature sets. This allows for the inclusion of features which may otherwise be excluded due to poor discriminatory factors and also in that their distributions are likely to show a better distribution.
2. Secondly, features may be combined using a weight matrix specifically designed to improve the probability distribution of the resulting feature sets. In this way the entropy smoothing is integrated concurrently within the construction of the normalisation maps associated within the feature sets and is unique to the present ICMetric approach.

The above two techniques are not mutually exclusive and may be employed in parallel with each other. These two techniques may be employed in parallel with traditional entropy smoothing applied by combining the resultant keys post key production. An illustration of the strength of feature correlations is given in the section on correlated features above. The strength of the correlation itself can be used to govern the entropy smoothing algorithm by calculating the variance of this value over a range of samples. This naturally gives rise to a probability distribution for the correlated values and may be subsequently employed in the entropy smoothing algorithm.

Embodiment for Introducing of Peers to a Secure Group

In a further embodiment peers may be introduced into a secure group by using a trusted peer to vouch for a new peer such that the new peer can then be a recognised part of the group, exchanging information between other peers in that group. This system allows a secure group of trusted peers to grow without the problem of needing to use a certification authority to verify the identity of a previously unknown peer.

A trusted group is a collection of peers where any n peers from a group of size k, where k>=n, can authenticate another peer in the group. The peers will each represent a point on a polynomial for secret sharing, analogously to how it is employed above, where solving a polynomial results in a value that can be used as a key. As previously indicated, the points on a polynomial used for secret sharing were represented by feature sets, but for the present discussing in the context of secure groups, each point is represented by a device. One example of how a group of trusted peers could be set-up is in an office environment, where all the work devices that will be authorised to communicate with each other are gathered together. In this example, the polynomial will require any two devices to authenticate a device so the group consists of only two devices when initially setup.

Both devices will represent a point on the polynomial of order one, where calculating the Y-intercept using the device's points will produce a key that can be used to decrypt data. This ensures no unknown device outside the trusted group can decrypt any encrypted data where the encryption key used is the Y-intercept for the polynomial.

A Y-intersect is generated for the polynomial via a suitable secure random process (if sufficient entropy is available from within the ICmetric, some of the ICmetric entropy may be employed here). Generating the Y-intersect first, before calculating the y-offsets would allow to the system to revoke potentially compromised peer polynomial points by generating a new intercept and new offsets. This allows the key to change whilst still keeping it relevant to a device's ICMetrics.

Once a Y-intersect value has been calculated, both devices can generate their own X value for an X, Y co-ordinate pair. One way this can be done is to generate their ICMetric key and hash it twice. Once both intercept and X value for each device have been generated, corresponding y values can be calculated. This gives points for the order one polynomial that can be solved using 2 points.

It is possible to create an initial group from more than two devices. Principally, as many devices are required as would be wanted when attempting to authenticate a device. Requiring N devices for authentication means N devices are needed to start with and an order n−1 polynomial created a during the system setup. Once a secure and trusted group is set up, it can be used to permit peers within that group to help identify one another through the use of secret sharing (for example Shamir Secret Sharing). This sharing technique uses a polynomial to calculate a Y intersect for n points, where n is number of peers required to authenticate an individual peer.

Existing group members can introduce new peers by requesting a unique identifier from the peer to introduce. Once the group member receives this, it can place this value on to an existing polynomial already used for identifying trusted peers. To give a more specific example in detail, many military decisions require the authorisation from additional peers before they can be asserted. This responsibility can be shared between peers through the division of a single key into multiple parts. It should also be possible to freely introduce peers to this responsibility. When sufficient parts are reconstructed, the initial key can be validated. It is therefore appropriate that the security of these parts be guaranteed. The following example shows how ICMetrics can be used to provide the parts of such a shared key securely.

1. A group of known peers are set up to communicate with each other over a shared secure channel
2. A subset of the peers are required at all times for communication to occur
3. A subset of these peers can vouch for a new peer and introduce it into this group
4. Each peer of the subset produces a portion of a shared key; each portion can be derived from each device's ICMetric process
5. Conventionally, in this system a compromised peer could request the portions from the other peers. The only way a compromised peer could gain authorisation would be to successfully spoof a legitimate identity to request parts from other peers in the group.
6. However, using the ICMetric process to generate the parts can result in the compromised peer producing an incorrect part itself as the device characteristics change during a spoof attack. This can also prevent the peer from establishing communication with other peers in the group, preventing the request of their parts and leading to the device being revoked from the group.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such 5 features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for generating an encryption key for use in an encryption process at a device, the method comprising: measuring respective values of a plurality of features of the device to generate a plurality of measured feature values, modifying the measured feature values of the plurality of features to generate a plurality of modified values, and using the modified values as feature values, normalising the feature values using a respective normalisation map for each feature to generate a plurality of normalised values, generating the encryption key in dependence on the normalised values, calibrating the feature values in advance of generating the encryption key by: determining a plurality of calibration values for each of the plurality of features of the device, generating a distribution of calibration values for each feature, normalising each distribution, and generating the respective normalisation map for each feature in dependence on the normalised distributions.

2. A method according to claim 1, in which modifying the measured feature values comprises performing one or more of a mask operation and a bit-shift operation on the measured feature values.

3. A method according to claim 2, in which the mask operation comprises applying one or more of a bitwise XOR mask and a bitwise XNOR mask to at least one predetermined bit.

4. A method according to claim 1, in which calibrating the feature values comprises determining the plurality of calibration values for at least one feature at a plurality of devices.

5. A method according to claim 1, in which the distribution comprises the frequency of occurrence of each calibration value.

6. A method according to claim 1, in which normalising the distribution comprises associating a calibration value, or a set of calibration values, of a particular feature to a predetermined value.

7. A method according to claim 1, in which each calibration value comprises a word of a predetermined size.

8. A method according to claim 6, in which the predetermined value comprises a word of a predetermined size.

9. A method according to claim 1, in which the plurality of features comprises one or more hardware feature and/or one or more software feature.

10. A method according to claim 1, in which the plurality of features comprise an indication of one or more of: network connectivity of the device, network activity of the device, VOIP activity of the device, location service activity of the device, a MAC address and/or a serial number of the device, the number and/or identity of open ports of the device, the number and/or identity of active processes of the device, disk performance during one or both of a read operation and a write operation, an amount of free and/or active RAM at the device, the number and/or identity of one or more hardware components of the device, a device-specific bias associated with an embedded system at the device, a temperature of a hardware component of the device, a power state of the device, a sensor of the device and/or an output of the sensor, a data and/or a media file at the device, a contact list at the device, how the device is accessed, telephony codes used by the device, and an attribute of a container at the device, the attribute being associated with at least one of a CPU feature, a memory feature and a network-related feature.

11. A method according to claim 10, in which the indication of network connectivity comprises an indication of one or more of: whether the device is connected to a network, a measure of performance of a network connection, whether the network connection is over a WAN and/or a LAN, whether the network connection is over one or more of a cellular connection, a Wi-Fi connection, a Bluetooth connection, a NFC connection, a network identifier, an IP address of the device.

12. A method according to claim 11, in which the indication of whether the device is connected to a network comprises a Boolean value, and/or one of a "connected" state, a "connecting" state, a "disconnecting" state and a "communicating" state.

13. A method according to claim 1, in which the encryption key is used in an RSA algorithm, and the method comprises determining whether the encryption key is co-prime with the number of totatives of the RSA algorithm, and if so using the encryption key as the private key in the RSA algorithm, otherwise determining the result of an offset function of the encryption key, where an offset is selected so that the result of the offset function is co-prime with the number of totatives of the RSA algorithm, and using the result of the offset function as the private key of the RSA algorithm.

14. A method according to claim 1, in which the encryption key is used in an elliptic curve cryptographic algorithm, wherein parameters of the elliptic curve algorithm comprise a base point G of the elliptic curve and a multiplicative order n of the base point, the method comprising determining whether the encryption key is within [1, n−1], and if so using the encryption key as the private key of the elliptic curve algorithm, otherwise applying a modulo-operation to the encryption key with n as the modulus to obtain the private key.

15. A method for securely processing a private key at a device comprising: receiving a private key at the device, receiving an encryption key generated according to claim 1, combining the encryption key with the private key using a combination function to generate an enhanced key, and storing the enhanced key.

16. A method according to claim 15, in which at least one of the private key and the encryption key is discarded in response to storing the enhanced key.

17. A method for securely processing a private key at a device comprising receiving an encryption key generated according to claim 1, combining the encryption key with the enhanced key generated according to claim 15, wherein the encryption key and the enhanced key are combined using a combination function to thereby retrieve the private key.

18. A non-transitory computer-readable storage medium having stored thereon computer-readable instructions that, when executed at a computer system, cause the computer system to perform a method for generating an encryption key for use in an encryption process at a device, the method comprising: measuring respective values of a plurality of features of the device to generate a plurality of measured feature values, modifying the measured feature values of the plurality of features to generate a plurality of modified values, and using the modified values as feature values, normalising the feature values using a respective normalisation map for each feature to generate a plurality of normalised values, generating the encryption key in dependence on the normalised values, calibrating the feature values in advance of generating the encryption key by: determining a plurality of calibration values for each of the plurality of features of the device, generating a distribution of calibration values for each feature, normalising each distribution, and generating the respective normalisation map for each feature in dependence on the normalised distributions.

19. A system for generating an encryption key for use in an encryption process at a device, the system comprising a processor configured to:
  measure respective values of a plurality of features of the device to generate a plurality of measured feature values,
  modify the measured feature values of the plurality of features to generate a plurality of modified values, and use the modified values as feature values,
  normalise the feature values using a respective normalisation map for each feature to generate a plurality of normalised values,
  generate the encryption key in dependence on the normalised values,
  calibrate the feature values in advance of generating the encryption key by:
    determining a plurality of calibration values for each of the plurality of features of the device,
    generating a distribution of calibration values for each feature,
    normalising each distribution, and
    generating the respective normalisation map for each feature in dependence on the normalised distributions.

* * * * *